(12) United States Patent
Tian et al.

(10) Patent No.: US 12,197,196 B2
(45) Date of Patent: Jan. 14, 2025

(54) MULTI-ROBOT COLLABORATIVE PLANNING METHOD FOR MACHINING LARGE CAPSULE MEMBER OF SPACECRAFT

(71) Applicant: NANJING UNIVERSITY OF AERONAUTICS AND ASTRONAUTICS, Nanjing (CN)

(72) Inventors: Wei Tian, Nanjing (CN); Jiamei Lin, Nanjing (CN); Bo Li, Nanjing (CN); Wenhe Liao, Nanjing (CN); Pengcheng Li, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 0 days.

(21) Appl. No.: 18/701,229

(22) PCT Filed: Jul. 25, 2023

(86) PCT No.: PCT/CN2023/109023
§ 371 (c)(1),
(2) Date: Apr. 13, 2024

(87) PCT Pub. No.: WO2024/060822
PCT Pub. Date: Mar. 28, 2024

(65) Prior Publication Data
US 2024/0385601 A1 Nov. 21, 2024

(30) Foreign Application Priority Data
May 17, 2023 (CN) .......................... 202310555238.X

(51) Int. Cl.
G05B 19/42 (2006.01)
B25J 9/00 (2006.01)
(Continued)

(52) U.S. Cl.
CPC ...... *G05B 19/41865* (2013.01); *B25J 9/0084* (2013.01); *B25J 9/1661* (2013.01); *B25J 11/005* (2013.01); *G05B 2219/50391* (2013.01)

(58) Field of Classification Search
None
See application file for complete search history.

(56) References Cited

U.S. PATENT DOCUMENTS 9,278,449 B1 *  3/2016  Linnell ................. B25J 9/1676
9,789,609 B2 * 10/2017  Crothers ................. B64F 5/00
(Continued)

FOREIGN PATENT DOCUMENTS

CN    101923669 A  * 12/2010  ............ B25J 9/1602
CN    105034008        11/2015
(Continued)

OTHER PUBLICATIONS

Jaacks, K., "Automated Circumferential Joint Assembly in Aircraft Production Development and Assessment of a Production Process", Aug. 2016, Department of Product and Production Development Chalmers University of Technology. (Year: 2016).*

(Continued)

*Primary Examiner* — Mohammad Ali
*Assistant Examiner* — Kelvin Booker
(74) *Attorney, Agent, or Firm* — Treasure IP Group, LLC

(57) ABSTRACT

A multi-robot collaborative planning method for machining a large capsule member of a Spacecraft is described. The method comprises: first, planning the number of instances of rotational displacement of a capsule, and the angle of each rotation; then, planning a multi-robot station layout and station switching strategy; and finally, when the position of the capsule and robot stations are fixed, planning a multi-robot machining task time sequence. The machining process for a large capsule is efficiently planned by selecting optimal (Continued)

rotation schemes and robot station positions, enhancing the rigidity of robot collaboration. This planning also streamlines the machining timeline, making the multi-robot task more compact and reducing idle time, thus boosting overall machining efficiency.

9 Claims, 9 Drawing Sheets

(51) Int. Cl.
  *B25J 9/16* (2006.01)
  *B25J 11/00* (2006.01)
  *G05B 19/40* (2006.01)
  *G05B 19/418* (2006.01)

(56) References Cited

U.S. PATENT DOCUMENTS

| | | | | |
|---|---|---|---|---|
| 10,792,728 | B2 * | 10/2020 | Oberoi | B25B 5/163 |
| 2016/0008869 | A1 * | 1/2016 | Oberoi | B23P 19/10 |
| | | | | 901/41 |
| 2017/0282367 | A1 * | 10/2017 | Haddadin | B25J 9/1602 |
| 2018/0318911 | A1 * | 11/2018 | Oberoi | B29C 65/70 |
| 2021/0107153 | A1 * | 4/2021 | Poornachandran | G05B 19/042 |
| 2022/0055214 | A1 * | 2/2022 | Masaoka | G05B 19/4187 |
| 2022/0161417 | A1 | 5/2022 | Watt et al. | |

FOREIGN PATENT DOCUMENTS

| | | | | |
|---|---|---|---|---|
| CN | 105034008 A | * | 11/2015 | B23K 9/12 |
| CN | 109849019 | | 6/2019 | |
| CN | 111590165 A | * | 8/2020 | B23K 9/02 |
| CN | 212218498 U | * | 12/2020 | B23K 9/02 |
| CN | 112207815 | | 1/2021 | |
| CN | 113276112 | | 8/2021 | |
| CN | 114454178 A | * | 5/2022 | B25J 9/16 |
| CN | 114669916 | | 6/2022 | |
| CN | 114925988 | | 8/2022 | |
| CN | 114925988 A | * | 8/2022 | G06Q 10/06 |
| CN | 115122338 | | 9/2022 | |
| CN | 115122338 A | * | 9/2022 | B23K 9/12 |
| CN | 115576332 | | 1/2023 | |
| CN | 115576332 A | * | 1/2023 | B23K 9/02 |
| JP | 2012196715 | | 10/2012 | |
| JP | 2012196719 | | 10/2012 | |
| JP | 2012210703 A | * | 11/2012 | B25J 9/1602 |
| KR | 20160070467 | | 6/2016 | |
| WO | 2022037410 | | 2/2022 | |
| WO | 2022094746 | | 5/2022 | |

OTHER PUBLICATIONS

Srinivasan, "Autonomous Control of an Industrial Robot Based On Formalized Process Description for Cabin Assembly", 2020, Deutscher Luft- und Raumfahrtkongress 2020 DocumentID: 530315. (Year: 2020).*

Halfmann et al., "Assembly Concepts for Aircraft Cabin Installation", Jul. 2010, Proceedings of the ASME 2010 10th Biennial Conference on Engineering Systems Design and Analysis. (Year: 2010).*

Kheddar et al., "Humanoid Robots in Aircraft Manufacturing, The Airbus Use Cases", Oct. 2019, Digital Object Identifier 10.1109/MRA.2019.2943395. (Year: 2019).*

Renner, T., "Robots Bring Airplane Production Up to Speed—Tech Briefs", Feb. 2019, Motion Design Magazine. (Year: 2019).*

Ma J W, LuX, Li G L, et al. Toolpath topology design based on vector field of tool feeding direction in sub-regional processing for complex curved surface[J]. Journal of Manufacturing Processes, 2020, 52:44-57.

Wei T, Dai J, Zhou W, et al. Process Planning and Control Technology on Multi-station Working Mode of Robot Drilling and Riveting System with Auxiliary Axis[J]. China Mechanical Engineering, 2014,25(01):23-27.

Wang Z, Gombolay M. Learning Scheduling Policies for Multi-Robot Coordination With Graph Attention Networks [J]. IEEE Robotics and Automation Letters, 2020, 5(3): 4509-4516.

High Precision Robot Operation Equipment and Technology in Aerospace Manufacturing Tian Wei , Jiao Jiachen , Li Bo , Cui Guangyu College of Mechanical and Electrical Engineering , Nanjing University of Aeronautics & Astronautics , Nanjing , 210016 , China. Journal of Nanjing University of Aeronautics & Astronautics, vol. 52 No. Jun. 3, 2020.

Reliability Allocation Method for Unmanned Aerial Vehicle ( UAV ) System Zhang Rui , Li Bo. Journal of Nanjing University of Aeronautics & Astronautics. vol. 41No. S Dec. 2009.

Schedule optimization of temporal and ordering constrained tasks in multi-robot cooperative machining system Liu Sharui, Tian Wei, Shen Jianxian, Li Bo, Hu Junshan, Computer integrated manufacturing systems vol. 28. No. Dec. 12, 2022.

* cited by examiner

| Robot base position | Machining task time axis (min) | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| Base Position 1 | a 1 | a 12 | a 17 | a 20 | a 46 | a 22 | a 28 | a 30 | a 42 | a 43 | | | | | | |
| Base Position 2 | | | | | | | | | | | | a 7 | a 11 | a 38 | a 48 | |
| Base Position 3 | b 2 | b 8 | b 16 | b 18 | b 19 | | | | | | | b 13 | b 23 | b 33 | b 36 | |
| Base Position 4 | | | | | | b 5 | b 9 | b 21 | b 25 | b 32 | b 49 | | | | | |
| Base Position 5 | | | | | | | | | | | | | | | | |
| Base Position 6 | 4 | 10 | 27 | | | 35 | 40 | | | | | | | | | |
| Base Position 7 | | | | | | | | | | | | | | | | |
| Base Position 8 | | | | | | | | | | | | 6 | 14 | 15 | 37 | |
| Base Position 9 | | | | | | 26 | 29 | 31 | 41 | 44 | 45 | 24 | 34 | 39 | 50 | |
| Base Position 10 | | | | | | | | | | | | | | | | | a- Robot 1;   b- Robot 2;   c- Robot 3;   d- Robot 4;

| Robot base position | Machining task time axis (min) | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| Base Position 1 | a 1 | a 12 | a 17 | a 20 | a 46 | a 22 | a 28 | a 30 | a 42 | a 43 | | | | | | |
| Base Position 2 | | | | | | | | | | | | a 7 | a 11 | a 38 | a 48 | |
| Base Position 3 | b 2 | b 8 | b 16 | b 18 | b 19 | | | | | | | b 13 | b 23 | b 33 | b 36 | |
| Base Position 4 | | | | | | b 3 | b 9 | b 21 | b 25 | b 32 | b 49 | | | | | |
| Base Position 5 | | | | | | | | | | | | | | | | |
| Base Position 6 | c 4 | c 10 | c 27 | | | c 35 | c 40 | | | | | | | | | |
| Base Position 7 | | | | | | | | | | | | | | | | |
| Base Position 8 | | | | | | | | | | | | c 6 | c 14 | c 15 | c 37 | |
| Base Position 9 | | | | | | d 26 | d 29 | d 31 | d 41 | d 44 | d 45 | d 47 | d 39 | d 50 | | |
| Base Position 10 | d 5 | d 24 | d 34 | | | | | | | | | | | | | | a – Robot 1;  b – Robot 2;  c – Robot 3;  d – Robot 4;

MULTI-ROBOT COLLABORATIVE PLANNING METHOD FOR MACHINING LARGE CAPSULE MEMBER OF SPACECRAFT

CROSS-REFERENCE OF RELATED APPLICATIONS

The application is a National Phase Application of PCT International Application No. PCT/CN2023/109023, International Filing Date Jul. 25, 2023, published Mar. 28, 2024, as International Publication Number WO/2024/060822, which claims priority from Chinese Patent Application No. 202310555238.X, filed May 17, 2023, all of which are incorporated herein by reference in their entireties.

Technical Field

The disclosure herein relates to the technical field of multi-robot collaborative planning, and in particular, to a multi-robot collaborative planning method for machining of large spacecraft cabin components.

BACKGROUND

The structural components of the large spacecraft cabin have the characteristics such as large size and low rigidity, and the number of brackets to be machined is large, which are unevenly distributed on the surface of the cabin. At present, such components are mainly machined by using a gantry type multi-axis numerically controlled machine tool. However, the numerically controlled machine tool has the problems such as large size, high manufacturing cost, single machining object, and limited machining travel. In this machining mode, the brackets need to be repeatedly assembled and disassembled, which affects the machining accuracy and efficiency of the structural components of the large spacecraft cabin. An in-situ manufacturing mode based on a multi-robot system has emerged to address the manufacturing problems, which involves fixing the cabin and moving robots to different positions for machining. This machining mode has high adaptability, can machine parts with large size spans, and simultaneously can avoid repeated disassembly and assembly of cabin brackets. The use of multi-robot collaborative operation can significantly improve the production efficiency of the large spacecraft cabin components.

However, due to the large size of the cabin components and the restriction of the robot executed machining range, the robots cannot machine all the brackets in the circumferential direction of the cabin without changing the cabin rotation angle. Often, it is necessary to use a positioner to rotate the cabin so that the robots can cover all bracket tasks. Cabin rotation planning is attributed to a zoned machining and manufacturing problem. According to the literature "Ma J W, Lu X, Li G L, et al. Toolpath topology design based on vector field of tool feeding direction in sub-regional processing for complex curved surface [J]. *Journal of Manufacturing Processes*, 2020, 52:44-57", a complex curved surface is divided into sub-regions and subdivision criteria are determined based on the geometric features or machining techniques of the curved surface, thus achieving machining with variable process parameters in different sub-regions. This method is mainly aimed at the machining mode of machine tools, and mainly focuses on the zoning research of local areas of large components with determined shapes and single machining feature. It is difficult to apply to spacecraft cabin structures with changes in the orientation and distribution of the brackets to be machined as the cabin rotates. Moreover, for the structural components of the large spacecraft cabin, their large size and wide machining range often require the robots to change their base positions during machining, firstly to cover all tasks, and secondly to adjust the posture during machining tasks, so as to improve the efficiency and quality of the machining tasks of the robot team. Literature "Wei T, Dai J, Zhou W, et al. Process Planning and Control Technology on Multi-station Working Mode of Robot Drilling and Riveting System with Auxiliary Axis [J]. *China Mechanical Engineering*, 2014, 25(01): 23-27" proposes a station-based planning strategy for industrial robots, which models and optimizes the position shifting mechanism of robots. This method fully considers the movement and position shifting problem of a single robot, but ignores the space competition problem in the multi-robot collaborative operation process, and cannot be directly applied to the situation where there is workspace competition in the multi-robot collaborative machining of the structural components of the large spacecraft cabin. The balance of task assignment plays a crucial role in the operation efficiency of the multi-robot team. Literature "Wang Z, Gombolay M. Learning Scheduling Policies for Multi-Robot Coordination With Graph Attention Networks [J]. *IEEE Robotics and Automation Letters*, 2020, 5(3): 4509-4516" proposes a network-based multi-robot coordinated learning scheduling strategy to address this problem. This method can quickly schedule and optimize robot teams of various sizes, and find high-quality solutions from multiple tasks. However, this method is only suitable for operations with fixed tasks and machining information that does not change over time, and cannot handle complex task situations where the orientation of the brackets outside the cabin changes with the rotation of the cabin. Generally speaking, the machining and manufacturing of existing large cabin components have the following shortcomings: 1) most of the existing large cabin components are machined by adopting a CNC machine tool machining mode, which has the problems such as high manufacturing cost, limited machining travel and long manufacturing cycle, and cannot meet the high-efficiency and high-precision manufacturing needs of large cabin components; and 2) the existing inventions are applicable to machining objects with a single feature and unchanged machining state information, while there is little mention of the double weak rigid structure with multiple robots as machining equipment and large weak rigid thin-walled components as machining objects in the existing inventions.

SUMMARY OF THE INVENTION

Aiming at the above technical problem, this application provides a multi-robot collaborative planning method for machining of large spacecraft cabin components, and the method includes:

step 1: importing a 3D mathematical model of a large spacecraft cabin, obtaining spacecraft cabin data and data of brackets to be machined on a surface of the cabin, the spacecraft cabin data including cabin length l and cabin radius r, the data of the brackets to be machined on the surface of the cabin including the number n of the brackets to be machined and the pose $T_i = \{x_i, y_i, z_i, a_i, b_i, c_i\}$ of an i-th bracket to be machined, i=1, 2, ..., n, where $x_i$, $y_i$ and $z_i$ represent space position coordinates of the i-th bracket to be machined, $a_i$, $b_i$ and $c_i$ respectively represent a rotation angle, a pitch angle and a deflection angle, and forming a task matrix T={$T_1, T_2, \ldots, T_n$} of the brackets to be machined;

step 2: solving a robot workspace envelope by adopting Monte Carlo method, and determining the unit composition of a multi-robot operation system on a premise of covering the cabin length l, so that the multi-robot system is able to machine all the brackets to be machined in an axial direction of the cabin;

step 3: based on the spacecraft cabin data and the data of the brackets to be machined on the surface of the cabin obtained in step 1, by using operability $\omega=(\det J(\theta)J(\theta)^T)^{1/2}$, a robot movement flexibility indicator, as an evaluation indicator, determining a space layout scheme of the multi-robot system to optimize the movement flexibility of the multi-robot system, where $J(\theta)$ represents a Jacobian matrix of robots, det represents a function for calculating a matrix determinant, and T represents matrix transposition; where "to optimize the movement flexibility of the multi-robot system" refers to optimizing the movement ability of the robots, i.e., ensuring that the robots do not experience joint singularity and maximizing the movement range of the robots from a current posture to other postures;

step 4: setting a step size $\alpha$ (unit: °) of the cabin rotation angle, determining the number k of cabin rotation positions and a cabin rotation position set {$R_1, R_2, \ldots, R_k$}, determining the reachability of the robots to poses of the brackets at the k cabin rotation positions, obtaining a processable task set {$X_1, X_2, \ldots, X_k$} at the k cabin rotation positions, where $R_k$ represents a k-th cabin rotation position and $X_k$ represents a processable task set at the k-th cabin rotation position, evaluating the machining performance of the processable task set {$X_1, X_2, \ldots, X_k$} at the k cabin rotation positions during robot executed machining by adopting a Cartesian space stiffness matrix $K=J(\theta)^{-T}K_\theta J(\theta)^{-1}$ of the robots, where $K_\theta$ represents a joint stiffness matrix of the robots, and obtaining stiffness values {$K_1, K_2, \ldots, K_k$} of robot executed machining tasks at the k cabin rotation positions, where $K_k$ represents a stiffness value of the robot executed machining tasks at the k-th cabin rotation position;

step 5: obtaining a total processable task set $X_R=\{X_1 \cup X_2 \cup \ldots \cup X_k\}$ at all the cabin rotation positions, selecting all cabin rotation combination schemes {$Rot_1, Rot_2, \ldots, Rot_n$} covering the total processable task set $X_R$ from the cabin rotation position set {$R_1, R_2, \ldots, R_k$} by adopting a genetic algorithm, where $Rot_n$ represents an n-th cabin rotation combination scheme, any cabin rotation combination scheme $Rot_i=\{R_a, R_b, \ldots, R_c\}$ covering the total processable task set $X_R$ including $k_i$ cabin rotation angles, where $R_a$, $R_b$ and $R_c$ respectively represent a-th, b-th and c-th cabin rotation positions, where a, b, c≤k and a, b, c∈N*, $k_{min} \leq k_i \leq k$, and $k_{min}$ represents the minimum number of rotation of the cabin, adopting a cabin rotation performance evaluation function Rot_fun= $(K_a+K_b+\ldots+K_c)/k_i$, where $K_a$, $K_b$ and $K_c$ respectively represent stiffness values of the robot executed machining tasks at the a-th, b-th and c-th cabin rotation positions, and selecting a scheme Rot={$R_a, R_b, \ldots, R_c$} with the optimal result of Rot_fun as a final cabin rotation scheme; where "a scheme with the optimal result" refers to a cabin rotation scheme with the largest stiffness value selected by using the Rot_fun function to calculate the average robot operation stiffness under different cabin rotation schemes, and comparing the average robot operation stiffness value under each scheme according to that the larger the stiffness value, the better the cabin rotation scheme;

step 6: on the basis of the selected optimal scheme Rot={$R_a, R_b, \ldots, R_c$}, setting a movement step size s of the robots along the axial direction of the cabin, setting the number j of base positions selectable for the robots and a robot base position set {$P_1, P_2, \ldots, P_j$}, where $P_j$ represents a j-th robot base position, traversing all the robot base positions, determining the reachability of the robots to poses of the brackets at the j robot base positions, obtaining a processable task set {$X_1^a, X_2^a, \ldots, X_j^a$} corresponding to robot base positions {$P_1, P_2, \ldots, P_j$} at the cabin rotation position $R_a$, evaluating the machining performance of the processable task set {$X_1^a, X_2^a, \ldots, X_j^a$} at the j robot base positions during robot executed machining by adopting a Cartesian space stiffness matrix $K=J(\theta)^{-T}K_\theta J(\theta)^{-1}$ of the robots, and obtaining stiffness values {$K_1^a, K_2^a, \ldots, K_j^a$} of the robot executed machining tasks at the j robot base positions, where $K_j^a$ represents a stiffness value of the robot executed machining tasks at the j-th robot base position;

obtaining processable task sets {$X_1^b, X_2^b, \ldots, X_j^b$} and {$X_1^c, X_2^c, \ldots, X_j^c$} corresponding to robot base positions {$P_1, P_2, \ldots, P_j$} at cabin rotation positions $R_b$ and $R_c$, and obtaining stiffness values {$K_1^b, K_2^b, \ldots, K_j^b$} and {$K_1^c, K_2^c, \ldots, K_j^c$} of corresponding robot executed machining tasks at the j robot base positions;

step 7: according to the optimal scheme Rot={$R_a, R_b, \ldots, R_c$} and a total processable task set $X^a=\{X_1^a \cup X_2^a \cup \ldots \cup X_j^a\}$ corresponding to all the robot base positions {$P_1, P_2, \ldots, P_j$} at the current cabin rotation position $R_a$, selecting robot base position combination schemes {$Pos_1^a, Pos_2^a, \ldots, Pos_{na}^a$} covering all tasks $X^a$ at the current cabin rotation position $R_a$, and obtaining stiffness values {$K_1^a, K_2^a, \ldots, K_{na}^a$} corresponding to the robot base position combination schemes, where $Pos_{na}^a$ represents an $n_a$-th robot base position combination scheme at the cabin rotation position $R_a$, $K_{na}^a$, represents a stiffness value of the robot executed machining tasks under the robot base position combination scheme $Pos_{na}^a$, where any robot base position combination scheme $Pos_i^a=\{P_d, P_e, \ldots, P_f\}$ at the cabin rotation position $R_a$ includes m robot base positions, $P_d$, $P_e$ and $P_f$ respectively represent d-th, e-th and f-th robot base positions, d, e, f≤j and d, e, f∈N*;

obtaining total processable task sets $X^b=\{X_1^b \cup X_2^b \cup \ldots \cup X_j^b\}$ and $=\{X_1^c \cup X_2^c \cup \ldots \cup X_j^c\}$ corresponding to robot base positions {$P_1, P_2, \ldots, P_j$} at the cabin rotation positions $R_b$ and $R_c$, selecting robot base position combination schemes {$Pos_1^b, Pos_2^b, \ldots, Pos_{nb}^b$} and {$Pos_1^c, Pos_2^c, Pos_{nc}^c$} covering all tasks $X^b$ and $X^c$ at the current cabin rotation positions $R_b$ and $R_c$, and obtaining stiffness values {$K_1^b, K_2^b, \ldots, K_{nb}^b$} and {$K_1^c, K_2^c, \ldots, K_{nc}^c$} corresponding to the robot base position combination schemes, where $Pos_{nb}^b$ represents an $n_b$-th robot base position combination scheme at the cabin rotation position $R_b$, and $K_{nc}^c$ represents a stiffness value of the robot executed machining tasks under the robot base position combination scheme $Pos_{nc}^c$;

according to the optimal scheme Rot={$R_a, R_b, \ldots, R_c$}, where for any robot base position scheme $Pos_i=\{Pos_g^a, Pos_h^b, \ldots, Pos_l^c\}$, g, h, l≤j and g, h, l∈N*, $Pos_g^a$ represents a robot base position scheme $Pos_g^a$ adopted at the cabin rotation position $R_a$, $Pos_h^b$ represents a robot base position scheme $Pos_h^b$ adopted at the cabin rotation position $R_b$, and $Pos_l^c$ represents a robot base position scheme $Pos_l^c$ adopted at the cabin rotation position $R_c$, calculating stiffness values $\{K_g^a, K_h^b, \ldots, K_l^c\}$ under the robot base position schemes $\{Pos_g^a, Pos_h^b, \ldots, Pos_l^c\}$, adopting a robot base position performance evaluation function Pos_fun=$K_g^a + K_h^b + \ldots + K_l^c$, and selecting a scheme POS=$\{Pos_g^a, Pos_h^b, \ldots, Pos_l^c\}$ with the optimal result of Pos_fun as a final robot base position scheme; where "a scheme with the optimal result" refers to a robot base position scheme with the largest stiffness value selected by using the Pos_fun function to calculate the average robot operation stiffness under different robot base position schemes, and comparing the average robot operation stiffness value under each scheme according to that the larger the stiffness value, the better the robot base position scheme;

step 8: on the basis of the final robot base position scheme Pos=$\{Pos_g^a, Pos_h^b, \ldots, Pos_l^c\}$, obtaining a processable task set $X_{ri}=\{X_{ri}^{ag}, X_{ri}^{bh}, \ldots, X_{ri}^{cl}\}$ for a robot $r_i$, where i=1, 2, ..., m, $X_{ri}^{ag}$ represents a processable task set for the robot $r_i$ at the cabin rotation position R in a case that the robot base position scheme $Pos_g^a$ is adopted, $X_{ri}^{bh}$ represents a processable task set for the robot $r_i$ at the cabin rotation position $R_b$ in a case that the robot base position scheme $Pos_h^b$ is adopted, and $X_{ri}^{cl}$ represents a processable task set for the robot $r_i$ at the cabin rotation position $R_c$ in a case that the robot base position scheme $Pos_l^c$ is adopted, and then assigning machining tasks to each robot; and step 9: assigning machining tasks by adopting a task auction algorithm based on market principles to obtain a task assignment result $A_{ri}=\{A_{ri}^{ag}, A_{ri}^{bh}, \ldots, A_{ri}^{cl}\}$ for the robot $r_i$, where $A_{ri}^{ag}$ represents a machining task assignment result for the robot $r_i$ at the cabin rotation position R under the robot base position scheme $Pos_g^a$, $A_{ri}^{bh}$ represents a machining task assignment result for the robot $r_i$ at the cabin rotation position $R_b$ under the robot base position scheme $Pos_h^a$, $A_{ri}^{cl}$ represents a machining task assignment result for the robot $r_i$ at the cabin rotation position R under the robot base position scheme $Pos_l^a$, optimizing a sequence of the robot executed machining tasks, forming a machining task timing scheduling table for each robot, and finally forming a machining scheduling scheme for a multi-robot team.

Further, in step 1, the poses of the brackets to be machined change with the rotation of the cabin, further influencing the reachability of the robots to the brackets to be machined.

Further, in step 2, the unit composition of the multi-robot operation system includes a robot model, an AGV model, the number m of robots, end effector construction, and tool model and specification, where the size of the cabin of the spacecraft determines the robot model, the AGV model and the number m of robots, and the process requirement of the brackets to be machined on the surface of the cabin determines the end effector construction and the tool model and specification.

Further, in step 3, the space layout scheme of the multi-robot system includes the distribution of the robots on two sides of the cabin, and a relative position relationship between each robot and the cabin; the distribution of the robots on the two sides of the cabin influences relative position relationships among the robots, further influencing task assignment and task timing scheduling links; the relative position relationship between each robot and the cabin refers to a horizontal distance between each robot and an axis of the cabin and the height of the axis of the cabin from the ground, and the distance between each robot and the cabin influences the machining posture of each robot, further influencing the machining quality of each robot.

Further, in step 4, the number k of the cabin rotation positions is calculated according to the following formula:

$$k=360/\alpha.$$

The number k of the cabin rotation positions is related to the step size $\alpha$ (unit: °) of the cabin rotation angle. An equation relationship k=360/$\alpha$ exists, where $\alpha$ represents the step size of the cabin rotation angle, in unit of "°".

Further, in step 5, the minimum number of rotation of the cabin $k_{min}$ refers to the minimum number of rotation of the cabin on a premise of covering all tasks in the total processable task set $X_R$.

Further, in step 6, the number j of base positions selectable for the robots is calculated according to the following formula:

$$j=2l/s.$$

The number j of the base positions selectable for the robots is related to the length l (unit: m) of the cabin and the movement step size s (unit: m) of the robots along the axial direction of the cabin. An equation relationship j=2l/s exists. The arrangement of the selectable base positions is required to ensure the spacing between base positions and ensure the safety of two or more robots during simultaneous machining.

Further, in step 8, assigning machining tasks to each robot refers to removing "overlapping tasks" and assigning "unique tasks" to a corresponding robot; the "overlapping tasks" refer to tasks processable for robots on the same side and processable at different cabin rotation angles, and the "unique tasks" refer to tasks only processable at a certain robot base position at a certain cabin rotation angle; the "unique tasks" are assigned to the corresponding robot, the current workload of the robot is calculated, and then the "overlapping tasks" are sequentially assigned to robots that are able to complete the overlapping tasks and have the least workload, completing a task assignment process for the multi-robot team.

Further, in step 9, the machining task timing scheduling table for each robot refers to a sequence that each robot $r_i$ completes the tasks in the corresponding task set $A_{ri}=(A_{ri}^{ag}, A_{ri}^{bh}, \ldots, A_{ri}^{cl})$; the machining scheduling scheme for the multi-robot team refers to a scheme in which cabin rotation angles and robot base positions during machining at different time nodes, and a list and sequence of robot executed machining tasks at different robot base positions are determined according to a time axis.

An example of this application further provides a storage medium, which stores a computer program or instruction, when the computer program or instruction being executed, implementing the multi-robot collaborative planning method for the machining of the large cabin components of the spacecraft.

An example of this application further provides a multi-robot collaborative planning system for machining of large spacecraft cabin components, which includes a cabin rotation planning system, a robot base position planning system and a machining task timing scheduling planning system. The cabin rotation planning system is configured to determine the number of rotation of the cabin and the angle of rotation at each time. The robot base position planning system is configured to plan the number of position shifting and space positions of each robot under a determined cabin rotation scheme. The machining task timing scheduling planning system is configured to plan the number and sequence of robot executed machining tasks under a determined cabin rotation scheme and a determined robot position shifting scheme.

Compared with the existing methods, the multi-robot collaborative planning method provided in this application has the following technical effects:

1. An example of this application can quickly and systematically plan a multi-robot collaborative machining process for large components, including cabin rotation planning, robot position shifting planning, and machining timing scheduling planning. It is particularly suitable for the field of multi-robot collaborative operation for large components and has the characteristics of wide coverage and strong universality.
2. An example of this application forms a machining task timing scheduling table for a machining process, which clearly indicates the machining tasks of robots at different time points, has guiding significance for the machining process of the multi-robot system and can significantly improve the machining efficiency of the multi-robot system. It is particularly suitable for core equipment manufacturing processes in major engineering fields such as aerospace and shipbuilding.

BRIEF DESCRIPTION OF FIGURES

The disclosure will be further specifically described below in combination with the embodiments with reference to the drawings. The advantages of the above and/or other aspects of the disclosure will become clearer.

DETAILED DESCRIPTION

Example 1

Figure 1:
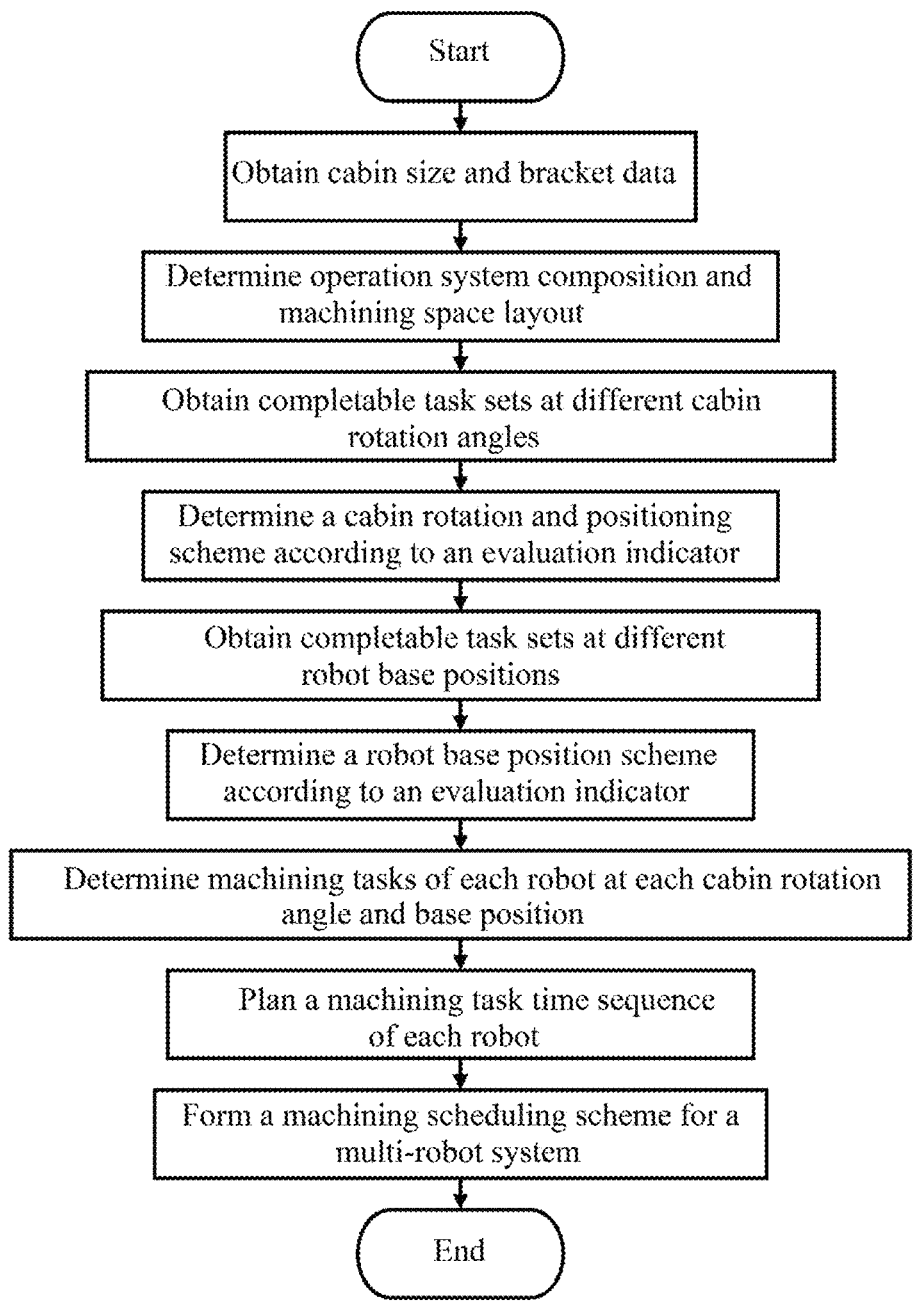
FIG. 1 illustrates a flowchart of a multi-robot collaborative planning method according to this application.

This example relates to a simulated cabin machining test. Referring to FIG. 1, this example provides a multi-robot collaborative planning method for machining of large spacecraft cabin components, which includes the following steps:

Step 1: a cabin is set to have a diameter of 2.6 m and a length of 5.6 m. The cabin is horizontally mounted on a rotating mechanism. A left end face of the cabin is fixed on a positioner. A positioner rotating wheel rotates to drive the cabin to rotate. A lower side of the cabin is an auxiliary supporting mechanism. Fifty brackets are distributed on the surface of the cabin. Bracket machining tasks are respectively numbered as 1 to 50. All the bracket machining tasks are planar milling tasks. The machining time for each task is set to be 1 min.

Step 2: a working envelope space of robots with different models is solved by adopting Monte Carlo method. The Monte Carlo method is also known as statistical simulation method or statistical experiment method, and is a numerical simulation method that takes probability phenomena as a research object. In this example, the angle of each joint is randomly given according to the limit of each robot join. The reachable space position of an end effector of each robot is obtained according to forward kinematics of the robots. Through multiple simulations, the reachable space position envelope space of the end effector of the robot is obtained, and the envelope space is approximated as the actual working envelope space of the robot. According to the Monte Carlo method, the space action range of each KUKA KR500-3MT robot is calculated to be 3.326 m, which meets the size requirement for the cabin to be machined in this example. Four KUKA KR500-3MT robots are selected as machining subjects according to the size of the cabin, and four AGV mobile cars are selected as mobile devices carrying the robots. According to the type of the bracket machining tasks, a milling end effector is selected as the end effector. The moving speed of the end effector of the robot is set to be 1 m/s. The above devices form a multi-robot operation system for the large cabin of the spacecraft.

Figure 2:
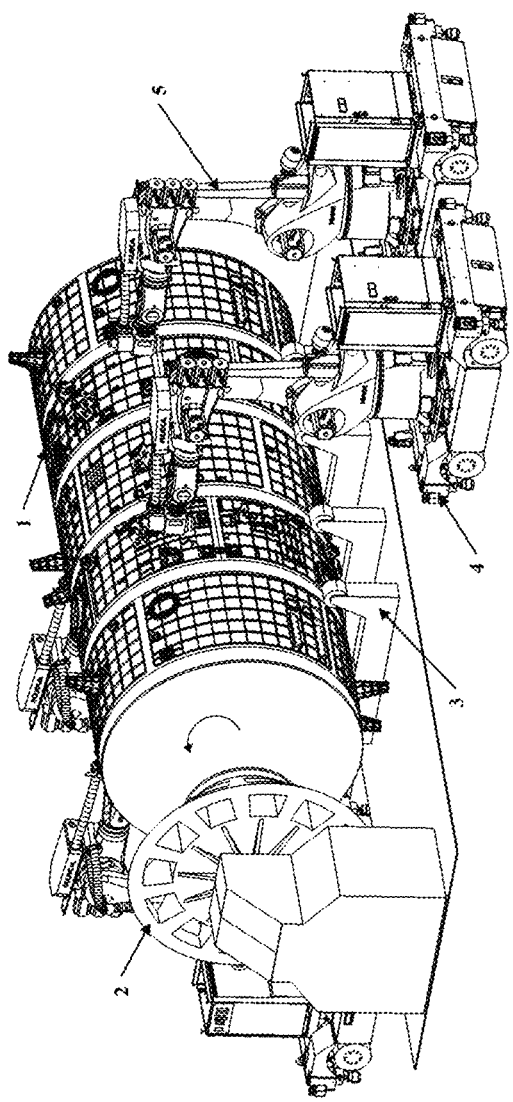
FIG. 2 illustrates a layout diagram of a multi-robot machining unit according to Example 1,
in the figure: 1-cabin, 2-positioner rotating wheel, 3-auxiliary supporting mechanism, 4-AGV, 5-robot; and the cabin arrow direction is the rotation direction.

Step 3: according to the size of the cabin of the spacecraft and the distribution of the bracket machining tasks, in order to cover all tasks in the axis direction of the cabin and optimize the movement flexibility of the multi-robot system, it is necessary to plan the space layout of multiple robots. "To optimize the movement flexibility of the robots" refers to making the ability of the robots to move in all directions under a certain configuration the strongest, thus avoiding joint singularity and maximizing the movement range of the robots in all directions under the current pose. (Singular points of industrial robots refer to space positions that cause the degrees of freedom of the robots to degenerate and cause inverse kinematics to have no solution. There are three types of singular points for six-axis series-joint robots, including wrist singular points, shoulder singular points, and elbow singular points. Singular points may cause the degrees of freedom of the robots to decrease and the robots unable to achieve current movement, as well as the velocities of some joints of the robots to tend towards infinity, thus causing the robot to lose control.) To choose a reasonable multi-robot layout scheme, operability $\omega=(\det J(\theta)J(\theta)^T)^{1/2}$, a robot movement flexibility indicator, is usually adopted as an evaluation indicator to evaluate the movement performance of the robot. The larger the value of the operability w, the better the movement flexibility of the robot. $J(\theta)$ represents a Jacobian matrix of robots, which describes the kinematic relationship of the end effectors of the robots in the joint space and Cartesian space, det represents a function for calculating a matrix determinant, and T represents matrix transposition. After calculation, arranging two robots on each side of the axis direction of the cabin can cover all machining tasks and enable the operability value of each robot to be larger, so the layout scheme for the robots is determined to be that two robots are arranged on each side of the cabin. Moreover, in order to ensure the safety of the multi-robot system and prevent collisions between the robots, it is stipulated that each robot can only move for position shifting on one side of the cabin, and the robot is not allowed to shift positions from one side of the cabin to the other side. The layout of a multi-robot executed machining unit and the rotation direction of the cabin are as illustrated in FIG. 2.

Figure 3:
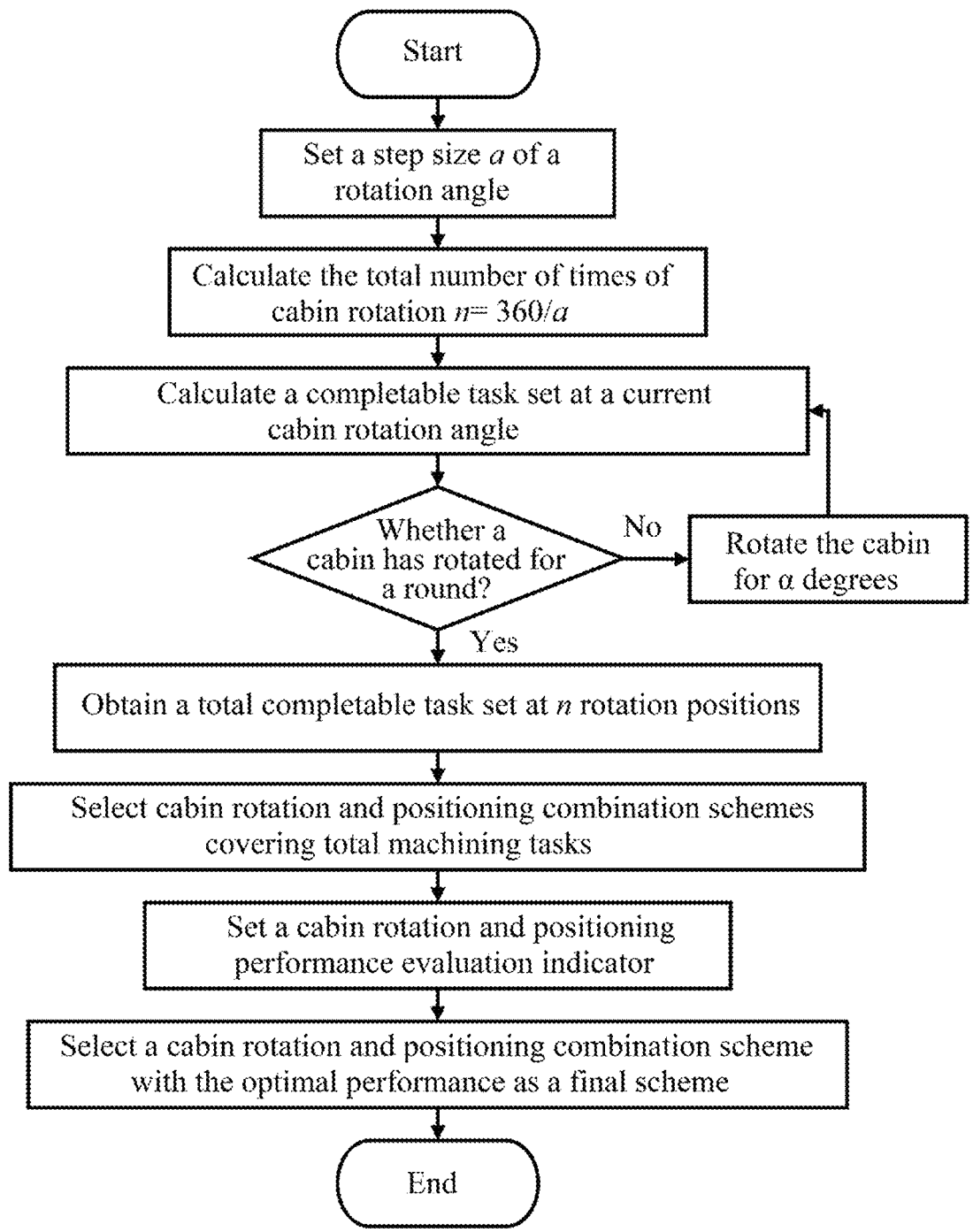
FIG. 3 illustrates a flowchart of a cabin rotation planning system according to Example 1.

Step 4: a flowchart of a cabin rotation planning system is as illustrated in FIG. 3, firstly, a step size of the cabin rotation angle is set, and the total number of rotation of the cabin under this step size is calculated to obtain a processable task set at all cabin rotation angles. Taking the initial position of the cabin as a 0° position, the step size for cabin rotation is selected to be α=30°. Under this step size, the number of rotation of the cabin is n=360/α=12, thus obtaining processable task sets at twelve cabin rotation angles as shown in Table 1.

TABLE 1

| Serial No. | Cabin rotation angle/° | Processable task Nos. at current cabin angle |
|---|---|---|
| 1 | 0 (360) | 3, 6, 9, 11, 14, 15, 21, 22, 23, 26, 28, 30, 31, 34, 43, 47, 48, 49, 50 |
| 2 | 30 | 4, 6, 7, 11, 13, 14, 15, 20, 22, 23, 28, 30, 34, 36, 37, 38, 39, 43, 46, 48, 50 |
| 3 | 60 | 1, 2, 4, 7, 8, 10, 11, 12, 13, 15, 18, 19, 20, 23, 24, 27, 33, 34, 36, 37, 38, 39, 46, 48, 50 |
| 4 | 90 | 1, 2, 4, 5, 7, 8, 10, 12, 16, 17, 18, 19, 20, 24, 25, 27, 29, 32, 33, 38, 41, 42, 44, 45, 46 |
| 5 | 120 | 2, 3, 5, 9, 10, 12, 16, 17, 21, 22, 25, 27, 29, 32, 35, 41, 42, 44, 45, 49 |
| 6 | 150 | 3, 9, 21, 22, 25, 26, 28, 29, 30, 31, 32, 35, 40, 41, 43, 44, 45, 47, 49 |
| 7 | 180 | 6, 11, 13, 14, 23, 26, 28, 30, 31, 35, 36, 40, 43, 47, 48, 49 |
| 8 | 210 | 4, 6, 7, 8, 11, 13, 14, 15, 23, 24, 28, 30, 31, 33, 34, 36, 37, 38, 39, 48, 50 |
| 9 | 240 | 7, 8, 10, 13, 15, 18, 19, 20, 24, 27, 33, 34, 36, 37, 38, 39, 46, 48, 50 |
| 10 | 270 | 8, 10, 12, 16, 17, 18, 19, 20, 27, 29, 37, 41, 44, 45, 46 |
| 11 | 300 | 9, 12, 16, 17, 18, 19, 21, 22, 25, 26, 29, 32, 35, 40, 41, 42, 44, 45, 46, 47 |
| 12 | 330 | 9, 14, 16, 17, 21, 22, 25, 26, 31, 32, 35, 40, 42, 43, 47, 49 |

Step 5: then, based on the obtained results of total processable task No. sets at the twelve cabin rotation positions mentioned above, cabin rotation combinations covering all tasks are selected. Totally twelve cabin rotation angle combinations covering all tasks are obtained. The rotation angle combinations of the cabin represented by serial number combinations are respectively (1, 3, 11), (1, 9, 11), (2, 4, 6), (2, 4, 12), (3, 5, 7), (3, 6, 12), (3, 7, 11), (4, 6, 8), (4, 8, 12), (5, 7, 9), (7, 9, 11), and (8, 10, 12).

Further, an evaluation indicator for the cabin rotation scheme is set. Taking the cabin rotation scheme Rot={$R_a$, $R_b$, ..., $R_c$} as an example, a comprehensive evaluation function Rot_fun=($K_a$+$K_b$+ ... +$K_c$)/$k_i$ of the number of rotation of the cabin $k_i$ and the machining stiffness {$K_a$, $K_b$, ..., $K_c$} of the robot is used as an evaluation indicator. The smaller the number of rotation of the cabin and the higher the stiffness of robot executed machining tasks, that is, the larger the result of the function Rot_fun, the better the cabin rotation scheme. The number of rotation of the cabin for all the above cabin rotation schemes is 3, that is, $k_i$=3. A genetic algorithm is adopted to solve a cabin rotation scheme with the largest stiffness of robot executed machining tasks in the above schemes. The scheme with the largest stiffness of robot executed machining tasks in the above schemes is (4, 6, 8). According to the comprehensive evaluation function Rot_fun=($K_a$+$K_b$+ ... +$K_c$)/$k_i$, (4, 6, 8) is considered as the optimal cabin rotation scheme.

According to the above cabin rotation evaluation indicator, the optimal cabin rotation combination serial number is (4, 6, 8), that is, the cabin rotation angle combination is (90°, 150°, 210°). The cabin rotation angles at each time and the tasks processable at each angle under this scheme are as shown in Table 2.

TABLE 2

| Serial No. | Cabin rotation angle/° | Processable task Nos. at current cabin angle |
|---|---|---|
| 1 | 90 | 1, 2, 4, 5, 7, 8, 10, 12, 16, 17, 18, 19, 20, 24, 25, 27, 29, 32, 33, 38, 41, 42, 44, 45, 46 |
| 2 | 150 | 3, 9, 21, 22, 25, 26, 28, 29, 30, 31, 32, 35, 40, 41, 43, 44, 45, 47, 49 |
| 3 | 210 | 4, 6, 7, 8, 11, 13, 14, 15, 23, 24, 28, 30, 31, 33, 34, 36, 37, 38, 39, 48, 50 |

Figure 4:
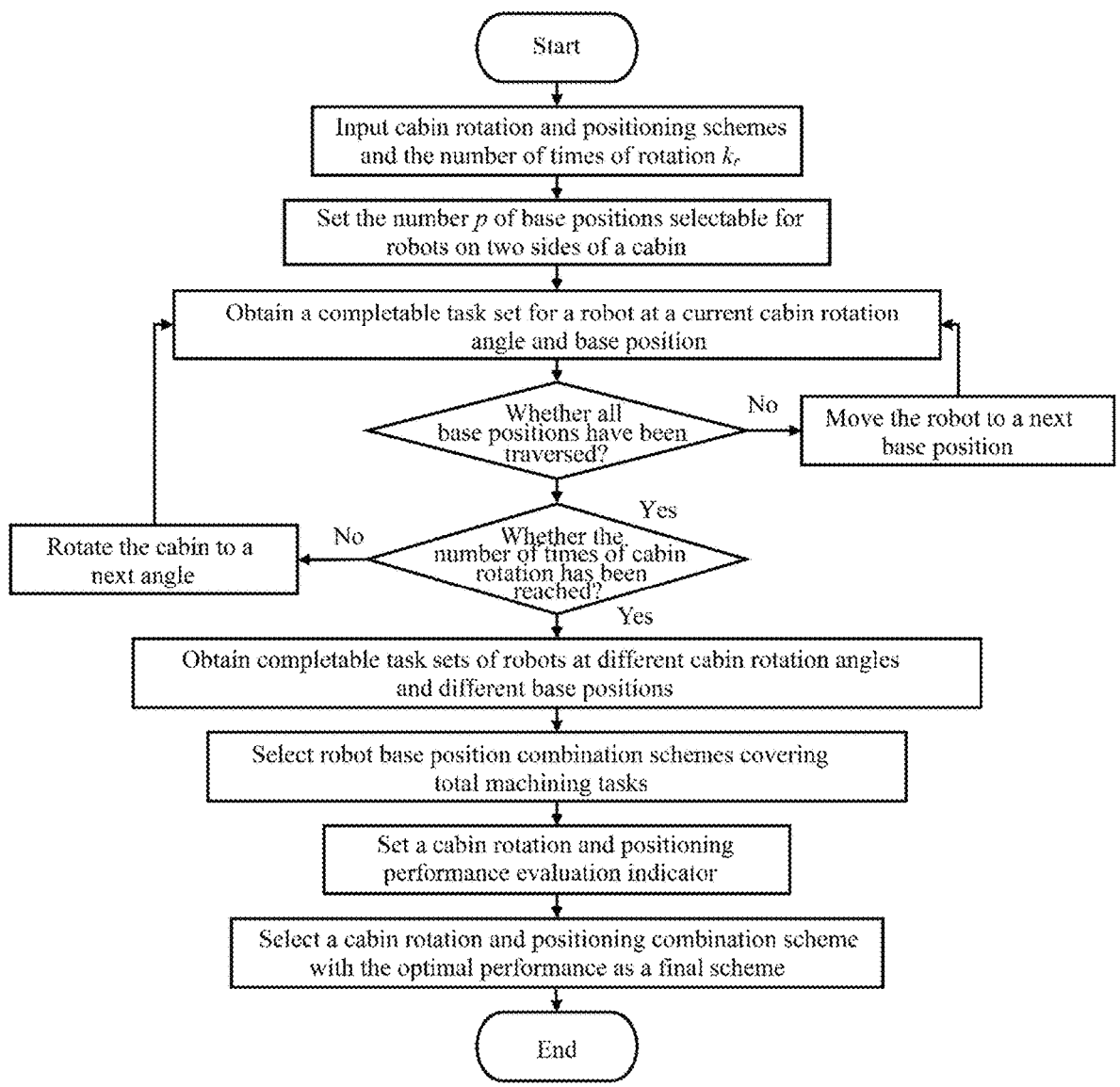
FIG. 4 illustrates a flowchart of a robot base position planning system according to Example 1.
Figure 5:
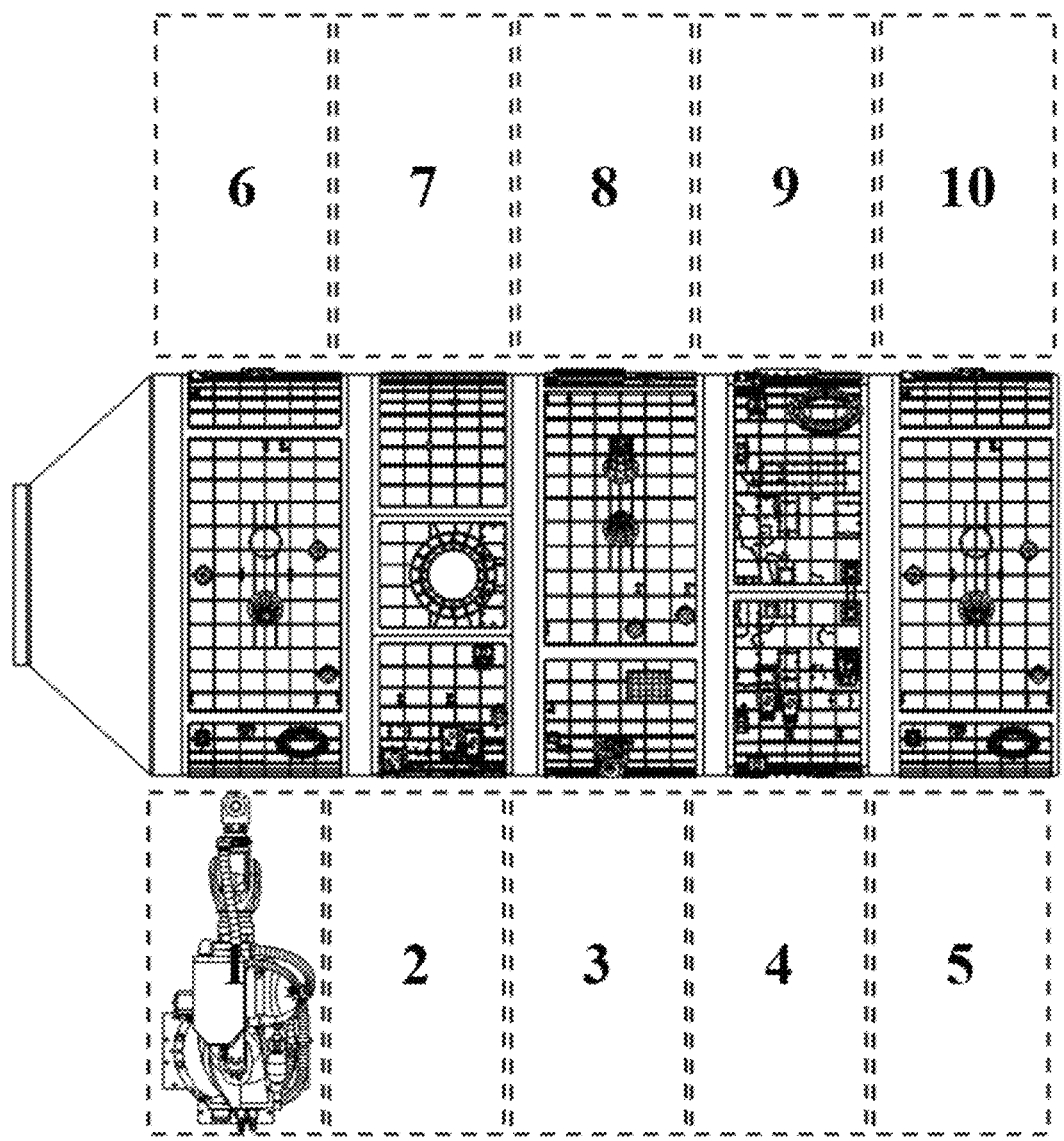
FIG. 5 illustrates a diagram of an example of arrangement of base positions selectable for robots according to Example 1.

Step 6: a flowchart of a robot base position planning system is as illustrated in FIG. 4, firstly, on the basis of the selected cabin rotation scheme, the number of base positions selectable for the robots is set, and the base position layout of the robots is determined. The length of the cabin is 5.6 m. Taking the two end faces of the cabin as a starting point and an ending point, along the axis direction of the cabin, according to the step size of 1.5 m, the machining base positions selectable for the robots are arranged, so five base positions are arranged on each side of the cabin, and there are totally ten selectable base positions on two sides, which are respectively numbered as 1 to 10, as illustrated in FIG. 5. Since the layout of the robots is that two robots are arranged on each side the axis of the cabin, when selecting base positions, the robots need to choose two different base positions from base positions 1-5 and base position 6-10, respectively. Under the situation that the cabin rotation scheme is determined, the obtained processable task sets for the robots at different robot base positions are as shown in Table 3.

TABLE 3

Processable task Nos. at different robot base positions

| Cabin rotation angle/° | Base Position 1 | Base Position 2 | Base Position 3 | Base Position 4 | Base Position 5 | Base Position 6 | Base Position 7 | Base Position 8 | Base Position 9 | Base Position 10 |
|---|---|---|---|---|---|---|---|---|---|---|
| 90 | 1, 12, 16, 17, 18, 20, 42, 46, | 1, 2, 12, 16, 17, 18, 19, 20, 25, 42, 46 | 2, 5, 12, 16, 17, 18, 19, 25, 46 | 2, 5, 12, 19, 25, 32, | 2, 5, 19, 32 | 4, 10, 27 | 10, 27 | 4, 8, 10, 27, 29, 41 | 8, 24, 41, 44 | 8, 44 |
| 150 | 21, 22, 28, 30, 42, 43 | 21, 22, 25, 28, 30, 43 | 3, 9, 21, 22, 25, 28, 43, 49 | 3, 9, 21, 25, 32, 49 | 3, 9, 32, 49 | 35, 40, 45, 47 | 35, 40, 45, 47 | 26, 29, 31, 35, 40, 41, 45, 47 | 26, 31, 35, 40, 44 | 26, 31 |
| 210 | 4, 7, 11, 30, 48 | 4, 7, 11, 13, 28, 30, 38, 48 | 4, 7, 8, 11, 13, 23, 28, 33, 36, 38, 48 | 7, 8, 11, 13, 23, 24, 33, 36, 38 | 8, 13, 23, 24, 33, 36, 38 | 6, 37, 50 | 6, 15, 34, 39, 50 | 6, 14, 15, 34, 37, 50 | 34, 39, 50 | 15, 31, 34 |

Step 7: then, base on the cabin rotation scheme selected in advance, robot base position combination schemes covering all tasks are obtained. The robot base position combination schemes covering all tasks are $\{(1, 3, 6, 7)_{90}, (2, 4, 8, 9)_{150}, (3, 4, 7, 8)_{210}\}$, $\{(1, 3, 6, 8)_{90}, (2, 4, 7, 9)_{150}, (2, 4, 7, 8)_{210}\}, \ldots, \{(2, 5, 8, 10)_{90}, (3, 5, 7, 8)_{150}, (2, 5, 8, 9)_{210}\}$, etc. Since the number of robot base position combination schemes that meet the requirements is large, only a few robot base position combination schemes are listed here. Taking the robot base position combination scheme $\{(1, 3, 6, 7)_{90}, (2, 4, 8, 9)_{150}, (3, 4, 7, 8)_{210}\}$ as an example, this expression represents that at the cabin rotation angle of 90°, the base positions of the four robots are respectively Base Position 1, Base Position 3, Base Position 6, and Base Position 7; at the cabin rotation angle of 150°, the base positions of the four robots are respectively Base Position 2, Base Position 4, Base Position 8, and Base Position 9; and at the cabin rotation angle of 210°, the base positions of the four robots are respectively Base Position 3, Base Position 4, Base Position 7, and Base Position 8.

Further, a robot base position scheme evaluation indicator is set. Taking the robot base position scheme $\{Pos_g^a, Pos_h^b, \ldots, Pos_l^c\}$ as an example, the comprehensive evaluation function $Pos\_fun = K_g^a + K_h^b + \ldots + K_l^c$ of the number of position shifting and the robot executed machining stiffness $\{K_g^a, K_h^b, \ldots, K_l^c\}$ is used as the evaluation indicator. The smaller the number of position shifting and the larger the operation stiffness value during robot executed machining tasks, that is, the larger the result of the function Pos_fun, the better the robot base position scheme. The number of position shifting for all the above robot base position schemes is 0, that is, under a fixed cabin rotation angle, each robot adopts a fixed machining base to complete the task. Only after the cabin is rotated for a specific angle can the base position of the robot be changed. A genetic algorithm is adopted to solve the robot base position scheme with the highest robot executed machining stiffness in the above schemes. The scheme with the highest robot executed machining stiffness in the above schemes is $\{(1, 3, 6, 10)_{90}, (1, 4, 6, 9)_{150}, (2, 3, 8, 9)_{210}\}$. That is, at the cabin rotation angle of 90°, the base positions of the four robots are respectively Base Position 1, Base Position 3, Base Position 6, and Base Position 10; at the cabin rotation angle of 150°, the base positions of the four robots are respectively Base Position 1, Base Position 4, Base Position 6, and Base Position 9; and at the cabin rotation angle of 210°, the base positions of the four robots are respectively Base Position 2, Base Position 3, Base Position 8, and Base Position 9. According to the comprehensive evaluation function $Pos\_fun = K_g^a + K_h^b + \ldots + K_l^c$, $\{(1, 3, 6, 10)_{90}, (1, 4, 6, 9)_{150}, (2, 3, 8, 9)_{210}\}$ is considered as the optimal robot base position scheme. The cabin rotation angles at each time and the tasks processable at each angle under this scheme are as shown in Table 4.

TABLE 4

| Cabin rotation angle/° | Processable task set | | | |
|---|---|---|---|---|
| | Base Position | Base Position | Base Position | Base Position |
| 90 | 1 | 3 | 6 | 10 |
| | 1, 12, 16, 17, 18, 20, 42, 46 | 2, 5, 12, 16, 17, 18, 19, 25, 46 | 4, 10, 27 | 8, 24, 41, 44 |
| | Base Position | Base Position | Base Position | Base Position |
| 150 | 1 | 4 | 6 | 9 |
| | 21, 22, 28, 30, 42, 43 | 3, 9, 21, 25, 32, 49 | 35, 40, 45, 47 | 26, 29, 31, 35, 40, 41, 45, 47 |
| | Base Position | Base Position | Base Position | Base Position |
| 210 | 2 | 3 | 8 | 9 |
| | 4, 7, 11, 13, 28, 30, 38, 48 | 4, 7, 8, 11, 13, 23, 28, 33, 36, 38, 48 | 6, 14, 15, 34, 37, 50 | 34, 39, 50 |

Figure 6:
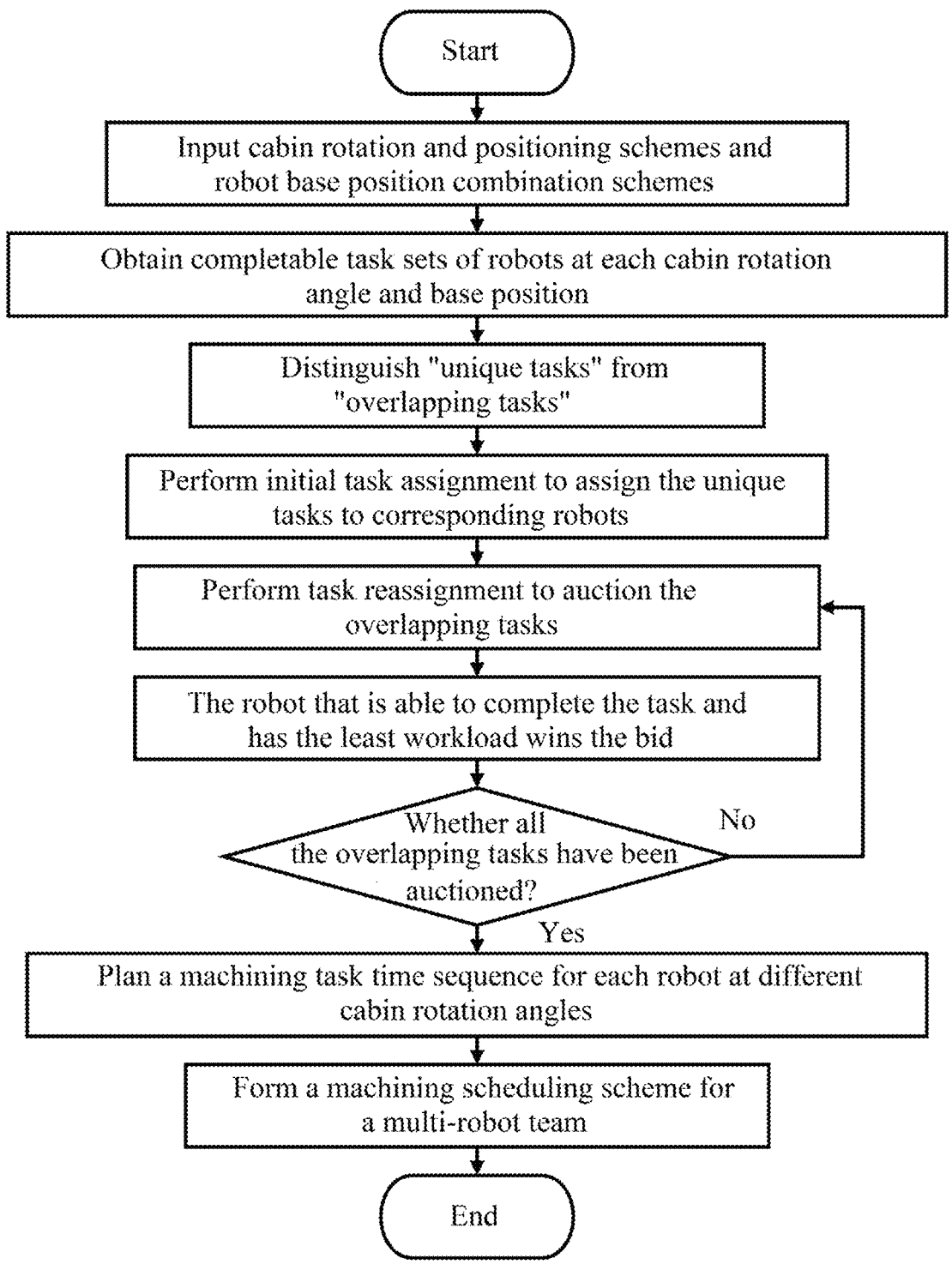
FIG. 6 illustrates a flowchart of a machining task timing scheduling planning system according to Example 1.

Step 8: a flowchart of a machining task timing scheduling planning system is as illustrated in FIG. 6, firstly, a processable task set for each robot at the corresponding base position is obtained according to the cabin rotation scheme and the robot base position scheme selected in advance. Then, machining tasks are assigned to each robot. "Overlapping tasks" processable by the robots on the same side and processable at different cabin rotation angles are removed to obtain an initial task assignment result. The tasks involved in the initial task assignment are tasks processable at a certain robot base position at a certain cabin rotation angle under the fixed cabin rotation scheme and robot base position scheme. This type of tasks is defined as "unique tasks", which are not processable at other cabin rotation positions. The initial task assignment result is as shown in Table 5, where the tasks are all "unique tasks".

TABLE 5

| Cabin rotation angle/° | Initial task assignment result | | | |
|---|---|---|---|---|
| 90 | Base Position 1 | Base Position 3 | Base Position 6 | Base Position 10 |
|  | 1, 20 | 2, 5, 19 | 10, 27 | 24, 44 |
| 150 | Base Position 1 | Base Position 4 | Base Position 6 | Base Position 9 |
|  | 22, 43 | 3, 9, 32, 49 |  | 26, 29, 31 |
| 210 | Base Position 2 | Base Position 3 | Base Position 8 | Base Position 9 |
|  |  | 23, 33, 36 | 6, 14, 15, 37 | 39 |

The distribution of "overlapping tasks" under this machining scheme is as shown in Table 6, where each task is processable at this robot base position at this cabin rotation angle.

TABLE 6

| Cabin rotation angle/° | Distribution of overlapping tasks | | | |
|---|---|---|---|---|
| 90 | Base Position 1 | Base Position 3 | Base Position 6 | Base Position 10 |
|  | 12, 16, 17, 18, 42, 46 | 12, 16, 17, 18, 25, 46 | 4 | 8, 41 |
| 150 | Base Position 1 | Base Position 4 | Base Position 6 | Base Position 9 |
|  | 21, 28, 30, 42 | 21, 25 | 35, 40, 45, 47 | 35, 40, 41, 45, 47 |
| 210 | Base Position 2 | Base Position 3 | Base Position 8 | Base Position 9 |
|  | 4, 7, 11, 13, 28, 30, 38, 48 | 4, 7, 8, 11, 13, 28, 38, 48 | 34, 50 | 34, 50 |

Further, the workload of each robot after obtaining the initial task is calculated. Through a task reassignment process, the "overlapping tasks" are sequentially assigned to robots that are able to complete the tasks and have the least workload. The final task assignment result is as shown in Table 7.

TABLE 7

| Cabin rotation angle/° | Final task assignment result | |
|---|---|---|
| 90 | Base Position 1 | Base Position 3 |
|  | 1, 12, 17, 20, 46 | 2, 5, 16, 18, 19, |
|  | Base Position 6 | Base Position 10 |
|  | 4, 10, 27 | 8, 24, 44 |
| 150 | Base Position 1 | Base Position 4 |
|  | 22, 28, 30, 42, 43 | 3, 9, 21, 25, 32, 49 |
|  | Base Position 6 | Base Position 9 |
|  | 35, 40 | 26, 29, 31, 41, 45, 47 |
| 210 | Base Position 2 | Base Position 3 |
|  | 7, 11, 38, 48 | 13, 23, 33, 36 |
|  | Base Position 8 | Base Position 9 |
|  | 6, 14, 15, 37 | 34, 39, 50 |

Step 9: finally, according to the task assignment result of each robot, a sequence of machining tasks for each robot at each cabin rotation angle and base position is optimized, the shortest machining task sequence is found out to minimize the movement distance of the end effector of the robot when completing all tasks and minimize the machining time of the multi-robot system, so that a machining task timing scheduling table for each robot is formed, and finally a machining scheduling scheme for a multi-robot team is formed.

Figures 7, 8:
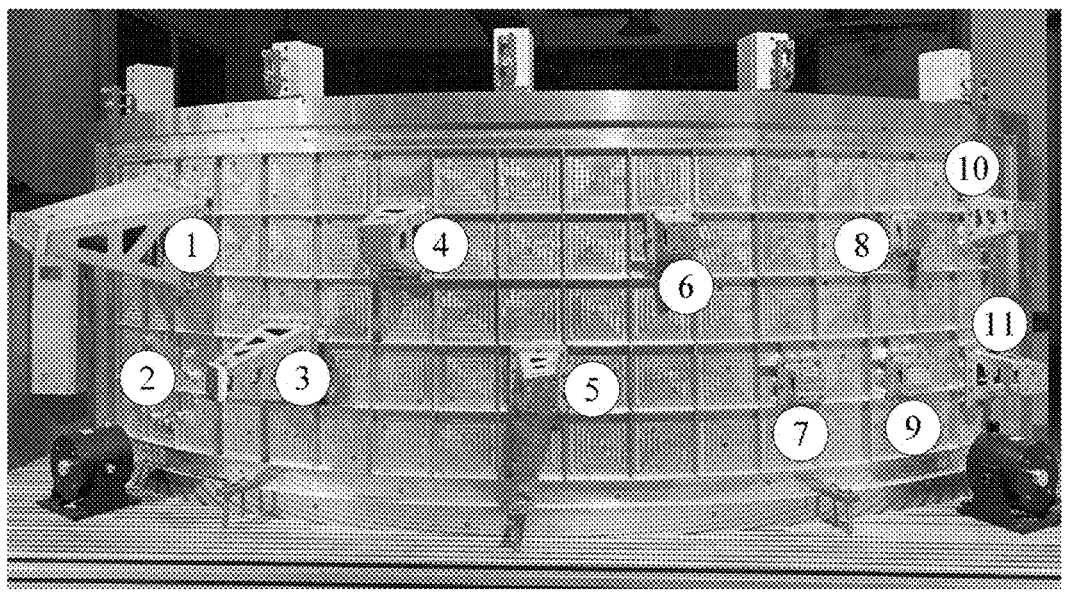
FIG. 7 illustrates a Gantt chart of machining task timing scheduling planning of a multi-robot system according to Example 1.
FIG. 8 illustrates a photo of an actual cabin wall plate according to Example 2.

The machining scheduling scheme for the multi-robot team refers to a scheme in which the cabin rotation angles and the robot base positions during machining at different time nodes, and a list and sequence of robot executed machining tasks at different robot base positions are determined according to a time axis. A Gantt chart of machining task timing scheduling planning of a multi-robot system is as illustrated in FIG. 7, where the numbers filled in the table are the numbers of tasks. Taking number 1 as an example, it represents that Task 1 is completed by Robot 1 at Machining Position 1 in 0-1 min under the situation that the cabin is rotated for 90°. According to the Gantt chart of machining task timing scheduling planning, the machining states of the multi-robot system at different time points and the task completion time of the multi-robot system can be clearly observed. The multi-robot collaborative task planning system and method for the machining of the large cabin components can provide scientific guidance for the multi-robot executed machining process.

Example 2

This example relates to an actual cabin wall plate machining test. The number of rotation of the cabin is 1 (k=1). A multi-robot collaborative planning method involved in a machining process specifically includes the following steps (see FIG. 1 for flowchart):

Step 1: a cabin wall plate is set to have an arc length of 3 m and a width of 1 m. The cabin wall plate is vertically fixed on a fixture table. Eleven brackets are distributed on a surface of the cabin wall plate. Bracket machining tasks are respectively numbered as 1 to 11. The actual cabin wall plate is as illustrated in FIG. 8. All the bracket machining tasks are planar milling tasks. The time of each machining task is set to be 1 min.

Step 2: according to the size of the cabin, two ER220B-2650 robots (purchased from Estun Company) are selected as machining subjects, and two AGV mobile cars are selected as mobile devices carrying the robots. According to the type of the bracket machining tasks, a milling end effector is selected as the end effector. The moving speed of the end effector of the robot is set to be 1 m/s. The above devices form a multi-robot operation system for the large cabin of the spacecraft.

Step 3: according to the size of the cabin wall plate of the spacecraft and the distribution of the bracket machining tasks, in order to cover all tasks on the cabin wall plate, two robots are selected to be arranged along a circumferential direction of the cabin. It is stipulated that the relative positions of the robots do not change, that is, Robot 1 can only be located on a left side of Robot 2, so as to prevent the robots from colliding due to the change of the relative positions.

Step 4: a flowchart of a cabin rotation planning system is as illustrated in FIG. 3, firstly, a step size of the cabin rotation angle is set, and the total number of rotation of the cabin under this step size is calculated to obtain a processable task set at all cabin rotation angles. Since the sample in this example is a cabin wall plate and the fixture is a fixed mechanism that cannot rotate, the number of cabin wall plate rotation positions is set to be k=1, that is, all following machining tasks of the cabin wall plate are carried out at an initial position of 0°. An obtained processable task set at the cabin wall plate rotation angle of 0° is as shown in Table 8. All tasks are processable at this cabin wall plate rotation position.

TABLE 8

| Serial No. | Cabin wall plate rotation angle/° | Processable task Nos. at current cabin angle |
|---|---|---|
| 1 | 0 (360) | 1, 2, 3, 4, 5, 6, 7, 8, 9, 10, 11 |

Step 5: after a total processable task set at all the cabin rotation positions is obtained, the total number of obtained cabin rotation angle combination covering all tasks is 1, that is, all the machining tasks of the cabin wall plate are completed at the rotation position of 0°. The cabin rotation angles at each time and the tasks processable at each angle are as shown in Table 9.

TABLE 9

| Serial No. | Cabin wall plate rotation angle/° | Processable task Nos. at current cabin angle |
|---|---|---|
| 1 | 0 (360) | 1, 2, 3, 4, 5, 6, 7, 8, 9, 10, 11 |

Figures 9, 10:
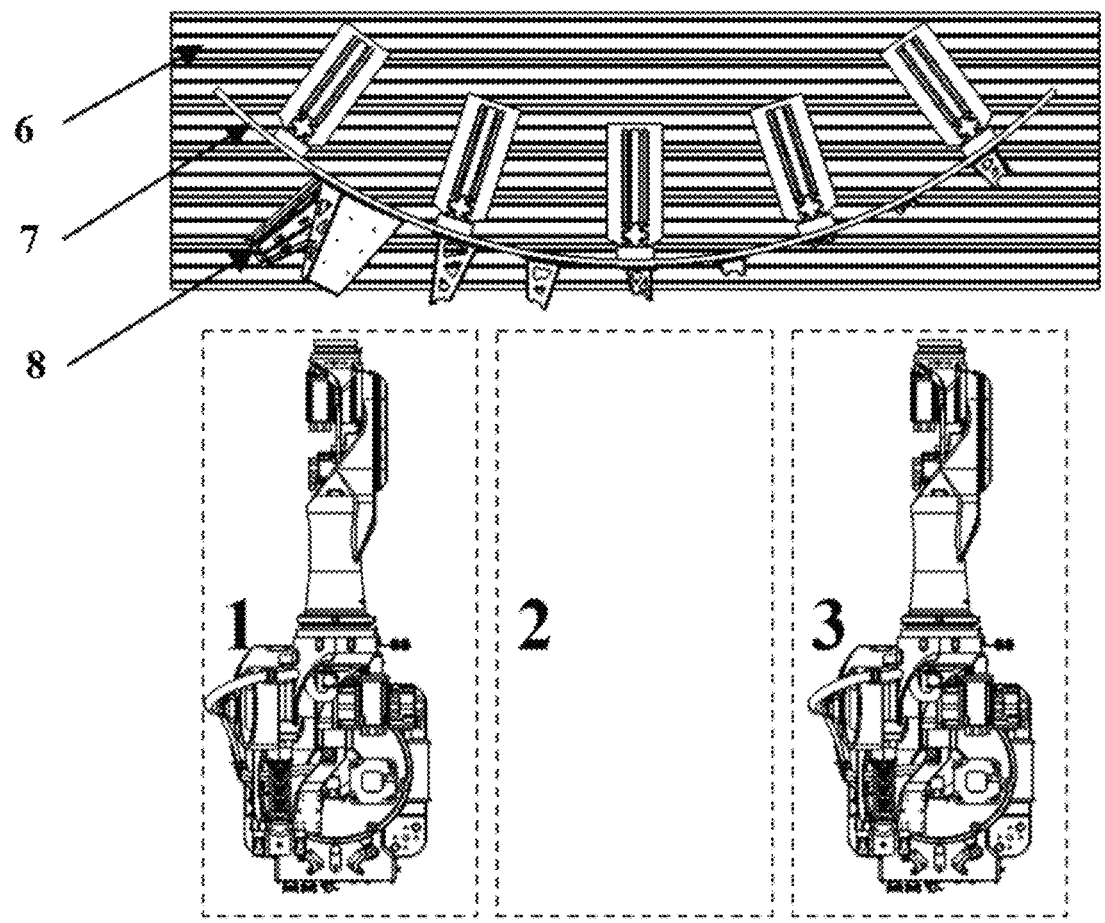
FIG. 9 illustrates a schematic diagram of machining base positions selectable for robots according to Example 2,
in the figure: 6-fixture table, 7-cabin wall plate, and 8-bracket to be machined.
FIG. 10 illustrates a Gantt chart of machining task timing scheduling planning of a multi-robot system according to Example 2.

Step 6: a flowchart of a robot base position planning system is as illustrated in FIG. 4, firstly, the number of base positions selectable for the robots is set, and the base position layout of the robots is determined. The circumferential arc length of the cabin wall plate is 3 m. Taking the two end faces of the cabin wall plate as a starting point and an ending point, along the circumferential direction of the cabin wall plate, according to the step size of 1.5 m, the machining base positions selectable for the robots are arranged, so totally three base positions are arranged, which are respectively numbered as 1 to 3, as illustrated in FIG. 9. Under the situation that the cabin wall plate rotation scheme is determined, an obtained processable task set for the robots at different robot base positions is as shown in FIG. 10.

TABLE 10

Processable task Nos. for each robot at different base positions

| Robot model | Base Position 1 | Base Position 2 | Base Position 3 |
|---|---|---|---|
| R1 | 1, 2, 3, 4, 5, 6, 7 | 3, 4, 5, 6, 7, 8, 9 | 5, 6, 7, 8, 9, 10, 11 |
| R2 | 1, 2, 3, 4, 5, 6, 7 | 3, 4, 5, 6, 7, 8, 9 | 5, 6, 7, 8, 9, 10, 11 |

Step 7: then a robot base position combination scheme covering all tasks is obtained, which is $\{(1, 3)_0\}$. Taking the robot base position combination scheme $\{(1, 3)_0\}$ as an example, this expression represents that the base positions of the robots at the cabin wall plate rotation angle of 0° are respectively Base Position 1 and Base Position 3.

Further, a robot base position scheme evaluation indicator is set. The number of position shifting and the operation stiffness during robot executed machining tasks are used as evaluation indicators. The smaller the number of position shifting and the larger the operation stiffness value during robot executed machining tasks, the better the robot base position scheme. A genetic algorithm is adopted to optimize the selection process of the robot base position scheme to obtain an optimal scheme among all schemes.

A robot base position combination selected according to the evaluation indicators of the robot base position scheme is $\{(1, 3)_0\}$, that is, at the cabin wall plate rotation angle of 0°, the base positions of the robots are respectively Base Position 1 and Base Position 3. The tasks processable at the cabin wall plate rotation angle of 0° under this scheme are as shown in Table 11. Due to the constraint between robot base positions, that is, Robot 1 must be located on a left side of Robot 2, it is defaulted in the table that Robot 1 is located at Base Position 1 and Robot 2 is located at Base Position 3.

TABLE 11

| Robot model | Base position No. | |
|---|---|---|
| | Base Position 1 | Base Position 3 |
| R1 | 1, 2, 3, 4, 5, 6, 7 | — |
| R2 | — | 5, 6, 7, 8, 9, 10, 11 |

Step 8: a flowchart of a machining task timing scheduling planning system is as illustrated in FIG. 6, firstly, a processable task set for each robot at the corresponding base position is obtained according to the cabin wall plate rotation scheme and the robot base position scheme selected in advance. Then, machining tasks are assigned to each robot. "Overlapping tasks" processable by the robots on the same side are removed to obtain an initial task assignment result. The tasks involved in the initial task assignment are tasks processable at a certain robot base position at a certain cabin wall plate rotation angle under the fixed cabin wall plate rotation scheme and robot base position scheme. This type of tasks is defined as "unique tasks", which are not processable at other cabin wall plate rotation positions. The initial task assignment result is as shown in Table 12, where the tasks are all "unique tasks".

TABLE 12

Initial task assignment result

| Robot model | Base Position 1 | Base Position 3 |
|---|---|---|
| R1 | 1, 2, 3, 4, | — |
| R2 | — | 8, 9, 10, 11 |

The distribution of "overlapping tasks" under this machining scheme is as shown in Table 13, where each task is processable at this robot base position at this cabin wall plate rotation angle.

TABLE 13

Distribution of overlapping tasks

| Robot model | Base Position 1 | Base Position 2 |
|---|---|---|
| R1 | 5, 6, 7 | — |
| R2 | — | 5, 6, 7 |

Further, the workload of each robot after obtaining the initial task is calculated. Through a task reassignment process, the "overlapping tasks" are sequentially assigned to robots that are able to complete the tasks and have the least workload. The final task assignment result is as shown in Table 14.

TABLE 14

Final task assignment result

| Robot model | Base Position 1 | Base Position 2 |
|---|---|---|
| R1 | 1, 2, 3, 4, 5 | — |
| R2 | — | 6, 7, 8, 9, 10, 11 |

Step 9: finally, according to the task assignment result of each robot, a sequence of machining tasks for each robot at each cabin wall plate rotation angle and base position is optimized, the shortest machining task sequence is found out to minimize the movement distance of the end effector of the robot when completing all tasks and minimize the machining time of the multi-robot system, so that a machining task timing scheduling table for each robot is formed, and finally a machining scheduling scheme for a multi-robot team is formed.

The machining scheduling scheme for the multi-robot team refers to a scheme in which the cabin wall plate rotation angles and the robot base positions during machining at different time nodes, and a list and sequence of robot executed machining tasks at different robot base positions are determined according to a time axis. A Gantt chart of machining task timing scheduling planning of a multi-robot system for the machining of the cabin wall plate is as illustrated in FIG. 10, where the numbers filled in the table are the numbers of tasks. Taking number 1 as an example, it represents that Task 1 is completed by Robot 1 at Machining Position 1 in 0-1 min under the situation that the cabin wall plate is rotated for 0°. According to the Gantt chart of machining task timing scheduling planning, the machining states of the multi-robot system at different time points and the task completion time of the multi-robot system can be clearly observed.

Example 3

Figures 11, 12:
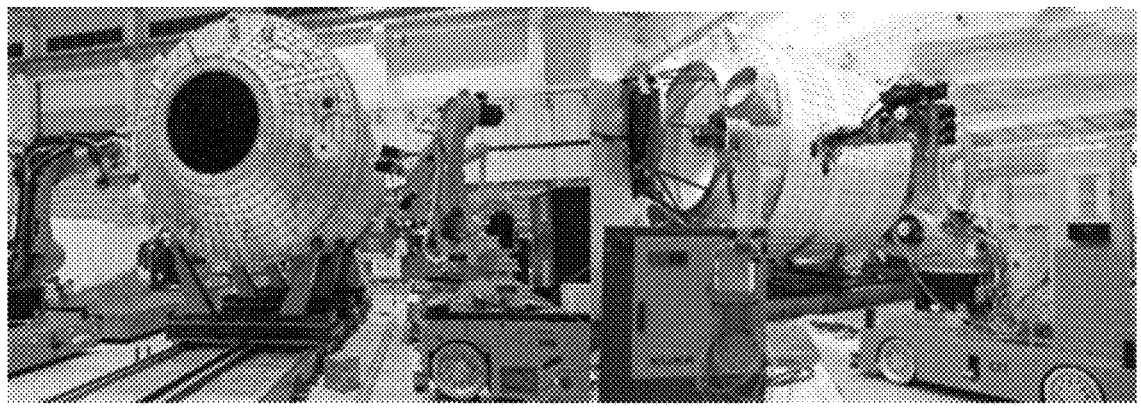
FIG. 11 illustrates a photo of a cabin according to Example 3.
FIG. 12 illustrates a Gantt chart of machining task timing scheduling planning of a multi-robot system according to Example 3.

This example relates to an actual cabin machining test (see Example 1 for the simulated test). A multi-robot collaborative planning method involved in a machining process specifically includes the following steps (see FIG. 1 for flowchart):

Step 1: referring to FIG. 11, a cabin has a diameter of 2.6 m and a length of 5.6 m. The cabin is horizontally mounted on a rotating mechanism. An end face of an inner side of the cabin is fixed on a positioner. A positioner rotating wheel drives the cabin to rotate. A lower side of the cabin is an auxiliary supporting mechanism. Fifty brackets are distributed on a surface of the cabin. Bracket machining tasks are respectively numbered as 1 to 50. All the bracket machining tasks are planar milling tasks. The machining time for each task is set to be 1 min.

Step 2: according to the Monte Carlo method, the space action range of each KUKA KR500-3MT robot is calculated to be 3.326 m, and the space action range of each ER170-2650 robot is 2.650 m, which meet the size requirement for the cabin to be machined in this example. Two KUKA KR500-3MT robots and two ER170-2650 robots are selected as machining subjects according to the size of the cabin, and four AGV mobile cars are selected as mobile devices carrying the robots. According to the type of the bracket machining tasks, a milling end effector is selected as the end effector. The moving speed of the end effector of the robot is set to be 1 m/s. The above devices form a multi-robot operation system for the large cabin of the spacecraft.

Step 3: according to the size of the cabin of the spacecraft and the distribution of the bracket machining tasks, in order to cover all tasks in the axis direction of the cabin and optimize the movement flexibility of the multi-robot system, it is necessary to plan the space layout of multiple robots. To choose a reasonable multi-robot layout scheme, operability $\omega=(\det J(\theta)J(\theta)^T)^{1/2}$, a robot movement flexibility indicator, is usually adopted as an evaluation indicator to evaluate the movement performance of the robot. The larger the value of the operability w, the better the movement flexibility of the robot. $J(\theta)$ represents a Jacobian matrix of robots, which describes the kinematic relationship of the end effectors of the robots in the joint space and Cartesian space, det represents a function for calculating a matrix determinant, and T represents matrix transposition. After calculation, two KR500-3MT robots are arranged on a left side of the axis direction of the cabin and two ER170-2650 robots are arranged on a right side. Moreover, in order to ensure the safety of the multi-robot system and prevent collisions between the robots, it is stipulated that each robot can only move for position shifting on one side of the cabin, and the robot is not allowed to shift positions from one side of the cabin to the other side. The layout of a multi-robot executed machining unit is as illustrated in FIG. 12.

Step 4: a flowchart of a cabin rotation planning system is as illustrated in FIG. 3, firstly, a step size of the cabin rotation angle is set, and the total number of rotation of the cabin under this step size is calculated to obtain a processable task set at all cabin rotation angles. Taking the initial position of the cabin as a 0° position, the step size for cabin rotation is selected to be α=30°. Under this step size, the number of rotation of the cabin is n=360/α=12, thus obtaining processable task sets at twelve cabin rotation angles as shown in Table 15.

TABLE 15

| Serial No. | Cabin rotation angle/° | Processable task Nos. at current cabin angle |
|---|---|---|
| 1 | 0 (360) | 3, 6, 9, 11, 14, 15, 21, 22, 23, 26, 28, 30, 31, 34, 43, 47, 48, 49, 50 |
| 2 | 30 | 4, 6, 7, 11, 13, 14, 15, 20, 22, 23, 28, 30, 34, 36, 37, 38, 39, 43, 46, 48, 50 |
| 3 | 60 | 1, 2, 4, 7, 8, 10, 11, 12, 13, 15, 18, 19, 20, 23, 24, 27, 33, 34, 36, 37, 38, 39, 46, 48, 50 |
| 4 | 90 | 1, 2, 4, 5, 7, 8, 10, 12, 16, 17, 18, 19, 20, 24, 25, 27, 29, 32, 33, 38, 41, 42, 44, 45, 46 |
| 5 | 120 | 2, 3, 5, 9, 10, 12, 16, 17, 21, 22, 25, 27, 29, 32, 35, 41, 42, 44, 45, 49 |
| 6 | 150 | 3, 9, 21, 22, 25, 26, 28, 29, 30, 31, 32, 35, 40, 41, 43, 44, 45, 47, 49 |
| 7 | 180 | 6, 11, 13, 14, 23, 26, 28, 30, 31, 35, 36, 40, 43, 47, 48, 49 |
| 8 | 210 | 4, 6, 7, 8, 11, 13, 14, 15, 23, 24, 28, 30, 31, 33, 34, 36, 37, 38, 39, 48, 50 |
| 9 | 240 | 7, 8, 10, 13, 15, 18, 19, 20, 24, 27, 33, 34, 36, 37, 38, 39, 46, 48, 50 |
| 10 | 270 | 8, 10, 12, 16, 17, 18, 19, 20, 27, 29, 37, 41, 44, 45, 46 |
| 11 | 300 | 9, 12, 16, 17, 18, 19, 21, 22, 25, 26, 29, 32, 35, 40, 41, 42, 44, 45, 46, 47 |
| 12 | 330 | 9, 14, 16, 17, 21, 22, 25, 26, 31, 32, 35, 40, 42, 43, 47, 49 |

Step 5: then, based on the obtained results of total processable task No. sets at the twelve cabin rotation positions mentioned above, cabin rotation combinations covering all tasks are selected. Totally twelve cabin rotation angle combinations covering all tasks are obtained. The rotation angle combinations of the cabin represented by serial number combinations are respectively (1, 3, 11), (1, 9, 11), (2, 4, 6), (2, 4, 12), (3, 5, 7), (3, 6, 12), (3, 7, 11), (4, 6, 8), (4, 8, 12), (5, 7, 9), (7, 9, 11), and (8, 10, 12).

Further, an evaluation indicator for the cabin rotation scheme is set. Taking the cabin rotation scheme Rot={$R_a$, $R_b$, . . . , $R_c$} as an example, a comprehensive evaluation function Rot_fun=($K_a$+$K_b$+ . . . +$K_c$)/$k_i$ of the number of rotation of the cabin $k_i$ and the machining stiffness {$K_a$, $K_b$, . . . , $K_c$} of the robot is used as an evaluation indicator. The smaller the number of rotation of the cabin and the higher the stiffness of robot executed machining tasks, that is, the larger the result of the function Rot_fun, the better the cabin rotation scheme. The number of rotation of the cabin for all the above cabin rotation schemes is 3, that is, $k_i$=3. A genetic algorithm is adopted to solve a cabin rotation scheme with the largest stiffness of robot executed machining tasks in the above schemes. The scheme with the largest stiffness of robot executed machining tasks in the above schemes is (4, 6, 8). According to the comprehensive evaluation function Rot_fun=($K_a$+$K_b$+ . . . +$K_c$)/$k_i$, (4, 6, 8) is considered as the optimal cabin rotation scheme.

According to the above cabin rotation evaluation indicator, the optimal cabin rotation combination serial number is (4, 6, 8), that is, the cabin rotation angle combination is (90°, 150°, 210°). The cabin rotation angles at each time and the tasks processable at each angle under this scheme are as shown in Table 16.

TABLE 16

| Serial No. | Cabin rotation angle/° | Processable task Nos. at current cabin angle |
|---|---|---|
| 1 | 90 | 1, 2, 4, 5, 7, 8, 10, 12, 16, 17, 18, 19, 20, 24, 25, 27, 29, 32, 33, 38, 41, 42, 44, 45, 46 |
| 2 | 150 | 3, 9, 21, 22, 25, 26, 28, 29, 30, 31, 32, 35, 40, 41, 43, 44, 45, 47, 49 |
| 3 | 210 | 4, 6, 7, 8, 11, 13, 14, 15, 23, 24, 28, 30, 31, 33, 34, 36, 37, 38, 39, 48, 50 |

Step 6: a flowchart of a robot base position planning system is as illustrated in FIG. 4, firstly, on the basis of the selected cabin rotation scheme, the number of base positions selectable for the robots is set, and the base position layout of the robots is determined. The length of the cabin is 5.6 m. Taking the two end faces of the cabin as a starting point and an ending point, along the axis direction of the cabin, according to the step size of 1.5 m, the machining base positions selectable for the robots are arranged, so five base positions are arranged on each side of the cabin, and there are totally ten selectable base positions on two sides, which are respectively numbered as 1 to 10, as illustrated in FIG. 5. Since the layout of the robots is that two robots are arranged on each side the axis of the cabin, when selecting base positions, the robots need to choose two different base positions from base positions 1-5 and base positions 6-10, respectively. Under the situation that the cabin rotation scheme is determined, the obtained processable task sets for the robots at different robot base positions are as shown in Table 17.

TABLE 17

| Cabin rotation angle/° | Processable task Nos. at different robot base positions | | | | |
|---|---|---|---|---|---|
| 90 | Base Position 1<br>1, 12 16, 17, 18, 20, 42, 46, | Base Position 2<br>1, 2, 12, 16, 17, 18, 19, 20, 25, 42, 46 | Base Position 3<br>2, 5, 12, 16, 17, 18, 19, 25, 46 | Base Position 4<br>2, 5, 12, 19, 25, 32, | Base Position 5<br>2, 5, 19, 32 |
| | Base Position 6<br>4, 10, 27 | Base Position 7<br>10, 27 | Base Position 8<br>4, 8, 10, 27, 29, 41 | Base Position 9<br>8, 24, 41, 44 | Base Position 10<br>8, 44 |
| 150 | Base Position 1<br>21, 22, 28, 30, 42, 43 | Base Position 2<br>21, 22, 25, 28, 30, 43 | Base Position 3<br>3, 9, 21, 22, 25, 28, 43, 49 | Base Position 4<br>3, 9, 21, 25, 32, 49 | Base Position 5<br>3, 9, 32, 49 |
| | Base Position 6<br>35, 40, 45, 47 | Base Position 7<br>35, 40, 45, 47 | Base Position 8<br>26, 29, 31, 35, 40, 41, 45,47 | Base Position 9<br>26, 31, 35, 40, 44 | Base Position 10<br>26, 31 |
| 210 | Base Position 1<br>4, 7, 11, 30, 48 | Base Position 2<br>4, 7, 11, 13, 28, 30, 38, 48 | Base Position 3<br>4, 7, 8, 11, 13, 23, 28, 33, 36, 38, 48 | Base Position 4<br>7, 8, 11, 13, 23, 24, 33, 36, 38 | Base Position 5<br>8, 13, 23, 24, 33, 36, 38 |
| | Base Position 6<br>6, 37, 50 | Base Position 7<br>6, 15, 34, 39, 50 | Base Position 8<br>6, 14, 15, 34, 37, 50 | Base Position 9<br>34, 39, 50 | Base Position 10<br>15, 31, 34 |

Step 7: then, based on the cabin rotation scheme selected in advance, robot base position combination schemes covering all tasks are obtained. The robot base position combination schemes covering all tasks are $\{(1, 3, 6, 7)_{90}, (2, 4, 8, 9)_{150}, (3, 4, 7, 8)_{210}\}$, $\{(1, 3, 6, 8)_{90}, (2, 4, 7, 9)_{150}, (2, 4, 7, 8)_{210}\}$, ..., $\{(2, 5, 8, 10)_{90}, (3, 5, 7, 8)_{150}, (2, 5, 8, 9)_{210}\}$, etc. Since the number of robot base position combination schemes that meet the requirements is large, only a few robot base position combination schemes are listed here. Taking the robot base position combination scheme $\{(1, 3, 6, 7)_{90}, (2, 4, 8, 9)_{150}, (3, 4, 7, 8)_{210}\}$ as an example, this expression represents that at the cabin rotation angle of 90°, the base positions of the four robots are respectively Base Position 1, Base Position 3, Base Position 6, and Base Position 7; at the cabin rotation angle of 150°, the base positions of the four robots are respectively Base Position 2, Base Position 4, Base Position 8, and Base Position 9; and at the cabin rotation angle of 210°, the base positions of the four robots are respectively Base Position 3, Base Position 4, Base Position 7, and Base Position 8.

Further, a robot base position scheme evaluation indicator is set. Taking the robot base position scheme $\{Pos_g^a, Pos_h^b, Pos_l^c\}$ as an example, the comprehensive evaluation function $Pos\_fun = K_g^a + K_h^b + \ldots + K_l^c$ of the number of position shifting and the robot executed machining stiffness $\{K_g^a, K_h^b, \ldots, K_l^c\}$ is used as the evaluation indicator. The smaller the number of position shifting and the larger the operation stiffness value during robot executed machining tasks, that is, the larger the result of the function Pos_fun, the better the robot base position scheme. The number of position shifting for all the above robot base position schemes is 0, that is, under a fixed cabin rotation angle, each robot adopts a fixed machining base to complete the task. Only after the cabin is rotated for a specific angle can the base position of the robot be changed. A genetic algorithm is adopted to solve the robot base position scheme with the highest robot executed machining stiffness in the above schemes. The scheme with the highest robot executed machining stiffness in the above schemes is $\{(1, 3, 6, 10)_{90}, (1, 4, 6, 9)_{150}, (2, 3, 8, 9)_{210}\}$. That is, at the cabin rotation angle of 90°, the base positions of the four robots are respectively Base Position 1, Base Position 3, Base Position 6, and Base Position 10; at the cabin rotation angle of 150°, the base positions of the four robots are respectively Base Position 1, Base Position 4, Base Position 6, and Base Position 9; and at the cabin rotation angle of 210°, the base positions of the four robots are respectively Base Position 2, Base Position 3, Base Position 8, and Base Position 9. According to the comprehensive evaluation function $Pos\_fun = K_g^a + K_h^b + \ldots + K_l^c$, $\{(1, 3, 6, 10)_{90}, (1, 4, 6, 9)_{150}, (2, 3, 8, 9)_{210}\}$ is considered as the optimal robot base position scheme. The cabin rotation angles at each time and the tasks processable at each angle under this scheme are as shown in Table 18.

TABLE 18

| Cabin rotation angle/° | Processable task set | |
|---|---|---|
| 90 | Base Position 1 | Base Position 3 |
| | 1, 12, 16, 17, 18, 20, 42, 46 | 2, 5, 12, 16, 17, 18, 19, 25, 46 |
| | Base Position 6 | Base Position 10 |
| | 4, 10, 27 | 8, 24, 41, 44 |
| 150 | Base Position 1 | Base Position 4 |
| | 21, 22, 28, 30, 42, 43 | 3, 9, 21, 25, 32, 49 |
| | Base Position 6 | Base Position 9 |
| | 35, 40, 45, 47 | 26, 29, 31, 35, 40, 41, 45, 47 |

TABLE 18-continued

| Cabin rotation angle/° | Processable task set | |
|---|---|---|
| 210 | Base Position 2 | Base Position 3 |
| | 4, 7, 11, 13, 28, 30, 38, 48 | 4, 7, 8, 11, 13, 23, 28, 33, 36, 38, 48 |
| | Base Position 8 | Base Position 9 |
| | 6, 14, 15, 34, 37, 50 | 34, 39, 50 |

Step 8: a flowchart of a machining task timing scheduling planning system is as illustrated in FIG. 6, firstly, a processable task set for each robot at the corresponding base position is obtained according to the cabin rotation scheme and robot base position scheme selected in advance. Then, machining tasks are assigned to each robot. "Overlapping tasks" processable by the robots on the same side and processable at different cabin rotation angles are removed to obtain an initial task assignment result. The tasks involved in the initial task assignment are tasks processable at a certain robot base position at a certain cabin rotation angle under the fixed cabin rotation scheme and robot base position scheme. This type of tasks is defined as "unique tasks", which are not processable at other cabin rotation positions. The initial task assignment result is as shown in Table 19, where the tasks are all "unique tasks".

TABLE 19

| Cabin rotation angle/° | Initial task assignment result | |
|---|---|---|
| 90 | Base Position 1 | Base Position 3 |
| | 1, 20 | 2, 5, 19 |
| | Base Position 6 | Base Position 10 |
| | 10, 27 | 24, 44 |
| 150 | Base Position 1 | Base Position 4 |
| | 22, 43 | 3, 9, 32, 49 |
| | Base Position 6 | Base Position 9 |
| | | 26, 29, 31 |
| 210 | Base Position 2 | Base Position 3 |
| | | 23, 33, 36 |
| | Base Position 8 | Base Position 9 |
| | 6, 14, 15, 37 | 39 |

The distribution of "overlapping tasks" under this machining scheme is as shown in Table 20, where each task is processable at this robot base position at this cabin rotation angle.

TABLE 20

| Cabin rotation angle/° | Distribution of overlapping tasks | |
|---|---|---|
| 90 | Base Position 1 | Base Position 3 |
| | 12, 16, 17, 18, 42, 46 | 12, 16, 17, 18, 25, 46 |
| | Base Position 6 | Base Position 10 |
| | 4 | 8, 41 |
| 150 | Base Position 1 | Base Position 4 |
| | 21, 28, 30, 42 | 21, 25 |
| | Base Position 6 | Base Position 9 |
| | 35, 40, 45, 47 | 35, 40, 41, 45, 47 |
| 210 | Base Position 2 | Base Position 3 |
| | 4, 7, 11, 13, 28, 30, 38, 48 | 4, 7, 8, 11, 13, 28, 38, 48 |
| | Base Position 8 | Base Position 9 |
| | 34, 50 | 34, 50 |

Further, the workload of each robot after obtaining the initial task is calculated. Through a task reassignment process, the "overlapping tasks" are sequentially assigned to robots that are able to complete the tasks and have the least workload. The final task assignment result is as shown in Table 21.

TABLE 21

| Cabin rotation angle/° | Final task assignment result | |
|---|---|---|
| 90 | Base Position 1<br>1, 12, 17, 20, 46<br>Base Position 6<br>4, 10, 27 | Base Position 3<br>2, 5, 16, 18, 19,<br>Base Position 10<br>8, 24, 44 |
| 150 | Base Position 1<br>22, 28, 30, 42, 43<br>Base Position 6<br>35, 40 | Base Position 4<br>3, 9, 21, 25, 32, 49<br>Base Position 9<br>26, 29, 31, 41, 45, 47 |
| 210 | Base Position 2<br>7, 11, 38, 48<br>Base Position 8<br>6, 14, 15, 37 | Base Position 3<br>13, 23, 33, 36<br>Base Position 9<br>34, 39, 50 |

Step 9: finally, according to the task assignment result of each robot, a sequence of machining tasks for each robot at each cabin rotation angle and base position is optimized, the shortest machining task sequence is found out to minimize the movement distance of the end effector of the robot when completing all tasks and minimize the machining time of the multi-robot system, so that a machining task timing scheduling table for each robot is formed, and finally a machining scheduling scheme for a multi-robot team is formed.

The machining scheduling scheme for the multi-robot team refers to a scheme in which the cabin rotation angles and the robot base positions during machining at different time nodes, and a list and sequence of robot executed machining tasks at different robot base positions are determined according to a time axis. A Gantt chart of machining task timing scheduling planning of a multi-robot system is as illustrated in FIG. 13, where the numbers filled in the table are the numbers of tasks. Taking number 1 as an example, it represents that Task 1 is completed by Robot 1 at Machining Position 1 in 0-1 min under the situation that the cabin is rotated for 90°. According to the Gantt chart of machining task timing scheduling planning, the machining states of the multi-robot system at different time points and the task completion time of the multi-robot system can be clearly observed. The multi-robot collaborative task planning system and method for the machining of the large cabin components can provide scientific guidance for the multi-robot executed machining process.

In specific implementation, this application provides a computer storage medium and a corresponding data processing unit. The computer storage medium can store a computer program, when executed by the data processing unit, the computer program can implement the multi-robot collaborative planning method for the machining of the large cabin components of the spacecraft provided in the disclosure and partial or all steps in each example. The storage medium may be a magnetic disk, an optical disk, a read-only memory (ROM), a random access memory (RAM), or the like.

Those skilled in the art can clearly understand that the technical solutions in the above examples may be implemented by means of computer programs and corresponding general hardware platforms thereof. Based on such understanding, the technical solutions in the above examples or the parts that contribute to the existing technology may be essentially reflected in the form of computer programs, i.e., software products. The computer programs, i.e., software products, may be stored in a storage medium, including several instructions to enable a device containing a data processing unit (which may be a personal computer, a server, a single-chip computer, an MUU or a network device) to execute the methods described in each example or certain parts of the examples of the disclosure.

The disclosure provides a multi-robot collaborative planning method for machining of large spacecraft cabin components. There are many specific methods and approaches to implement this technical solution, and the above are only exemplary embodiments of the disclosure. It should be pointed out that for those skilled in the art, several improvements and modifications may be made without departing from the principles of the disclosure. These improvements and modifications should also be considered as the scope of protection of the disclosure. All components not clearly defined in the above examples may be implemented by adopting the existing technology.

The invention claimed is:

1. A multi-robot collaborative planning method for machining of large spacecraft cabin components, comprising the following steps:
    providing a storage medium, storing a computer program, said computer program or instruction being executed, implementing the following steps:
    step 1: importing a 3D mathematical model of a large spacecraft cabin, obtaining spacecraft cabin data and data of brackets to be machined on a surface of the cabin, the spacecraft cabin data comprising cabin length l and cabin radius r, the data of the brackets to be machined on the surface of the cabin comprising the number n of the brackets to be machined and the pose $T_i=\{x_i, y_i, z_i, a_i, b_i, c_i\}$ of an i-th bracket to be machined, i=1, 2, . . . , n, wherein $x_i$, $y_i$ and $z_i$ represent space position coordinates of the i-th bracket to be machined, $a_i$, $b_i$ and $c_i$ respectively represent a rotation angle, a pitch angle and a deflection angle, and forming a task matrix $T=\{T_1, T_2, \ldots, T_n\}$ of the brackets to be machined;
    step 2: solving a robot workspace envelope by adopting Monte Carlo method, and determining the unit composition of a multi-robot operation system on a premise of covering the cabin length l, so that the multi-robot system is able to machine all the brackets to be machined in an axial direction of the cabin;
    step 3: based on the spacecraft cabin data and the data of the brackets to be machined on the surface of the cabin obtained in step 1, by using operability $\omega=(\det J(\theta)J(\theta))^T)^{1/2}$, a robot movement flexibility indicator, as an evaluation indicator, determining a space layout scheme of the multi-robot system to optimize the movement flexibility of the multi-robot system, wherein $J(\theta)$ represents a Jacobian matrix of robots, det represents a function for calculating a matrix determinant, and T represents matrix transposition;
    step 4: setting a step size α of the cabin rotation angle, determining the number k of cabin rotation positions and a cabin rotation position set $\{R_1, R_2, \ldots, R_k\}$, determining the reachability of the robots to poses of the brackets at the k cabin rotation positions, obtaining a processable task set $\{X_1, X_2, \ldots, X_k\}$ at the k cabin rotation positions, wherein $R_k$ represents a k-th cabin rotation position and $X_k$ represents a processable task set at the k-th cabin rotation position, evaluating the machining performance of the processable task set $\{X_1, X_2, \ldots, X_k\}$ at the k cabin rotation positions during robot executed machining by adopting a Cartesian space stiffness matrix $K=J(\theta)^{-T}K_\theta J(\theta)^{-1}$ of the robots, wherein $K_\theta$ represents a joint stiffness matrix of the robots, and obtaining stiffness values $\{K_1, K_2, \ldots, K_k\}$ of robot executed machining tasks at the k cabin rotation positions, wherein $K_k$ represents a stiffness value of the robot executed machining tasks at the k-th cabin rotation position;

step 5: obtaining a total processable task set $X_R=\{X_1 \cup X_2 \cup \ldots \cup X_k\}$ at all the cabin rotation positions, selecting all cabin rotation combination schemes $\{Rot_1, Rot_2, \ldots, Rot_n\}$ covering the total processable task set $X_R$ from the cabin rotation position set $\{R_1, R_2, \ldots, R_k\}$ by adopting a genetic algorithm, wherein $Rot_n$, represents an n-th cabin rotation combination scheme, any cabin rotation combination scheme $Rot_i=\{R_a, R_b, \ldots, R_c\}$ covering the total processable task set $X_R$ comprising $k_i$ cabin rotation angles, wherein $R_a$, $R_b$ and $R_c$ respectively represent a-th, b-th and c-th cabin rotation positions, wherein a, b, c≤k and a, b, c∈N*, $k_{min} \leq k_i \leq k$, and $k_{min}$ represents the minimum number of rotation of the cabin, adopting a cabin rotation performance evaluation function $Rot\_fun=(K_a+K_b+\ldots+K_c)/k_i$, wherein $K_a$, $K_b$ and $K_c$ respectively represent stiffness values of the robot executed machining tasks at the a-th, b-th and c-th cabin rotation positions, and selecting a scheme $Rot=\{R_a, R_b, \ldots, R_c\}$ with the optimal result of $Rot\_fun$ as a final cabin rotation scheme;

step 6: on the basis of the selected optimal scheme $Rot=\{R_a, R_b, \ldots, R_c\}$, setting a movement step size s of the robots along the axial direction of the cabin, setting the number j of base positions selectable for the robots and a robot base position set $\{P_1, P_2, \ldots, P_j\}$, wherein $P_j$ represents a j-th robot base position, traversing all the robot base positions, determining the reachability of the robots to poses of the brackets at the j robot base positions, obtaining a processable task set $\{X_1^a, X_2^a, \ldots, X_j^a\}$ corresponding to robot base positions $\{P_1, P_2, \ldots, P_j\}$ at the cabin rotation position $R_a$, evaluating the machining performance of the processable task set $\{X_1^a, X_2^a?, \ldots, X_j^a\}$ at the j robot base positions during robot executed machining by adopting a Cartesian space stiffness matrix $K=J(\theta)^{-T}K_\theta J(\theta)^{-1}$ of the robots, and obtaining stiffness values $\{K_1^a, K_2^a, \ldots, K_j^a\}$ of the robot executed machining tasks at the j robot base positions, wherein $K_j^a$ represents a stiffness value of the robot executed machining tasks at the j-th robot base position;

obtaining processable task sets $\{X_1^b, X_2^b, \ldots, X_j^b\}$ and $\{X_1^c, X_2^c, \ldots, X_j^c\}$ corresponding to robot base positions $\{P_1, P_2, \ldots, P_j\}$ at cabin rotation positions $R_b$ and $R_c$, and obtaining stiffness values $\{K_1^b, K_2^b, \ldots, K_j^b\}$ and $\{K_1^c, K_2^c, \ldots, K_j^c\}$ of corresponding robot executed machining tasks at the j robot base positions;

step 7: according to the optimal scheme $Rot=\{R_a, R_b, \ldots, R_c\}$ and a total processable task set $X^a=\{X_1^a \cup X_2^a \cup \ldots \cup X_j^a\}$ corresponding to all the robot base positions $\{P_1, P_2, \ldots, P_j\}$ at the current cabin rotation position $R_a$, selecting robot base position combination schemes $\{Pos_1^a, Pos_2^a, \ldots, Pos_{na}^a\}$ covering all tasks $X^a$ at the current cabin rotation position $R_a$, and obtaining stiffness values $\{K_1^a, K_2^a, \ldots, K_{na}^a\}$ corresponding to the robot base position combination schemes, wherein $Pos_{na}^a$ represents an $n_a$-th robot base position combination scheme at the cabin rotation position $R_a$, $K_{na}^a$ represents a stiffness value of the robot executed machining tasks under the robot base position combination scheme $Pos_{na}^a$, wherein any robot base position combination scheme $Pos_i^a=\{P_d, P_e, \ldots, P_f\}$ at the cabin rotation position $R_a$ comprises m robot base positions, $P_d$, $P_e$ and $P_f$ respectively represent d-th, e-th and f-th robot base positions, d, e, f≤j and d, e, f∈N*;

obtaining total processable task sets $X^b=\{X_1^b \cup X_2^b \cup \ldots \cup X_j^b\}$ and $=\{X_1^c \cup X_2^c \cup \ldots \cup X_j^c\}$ corresponding to robot base positions $\{P_1, P_2, \ldots, P_j\}$ at the cabin rotation positions $R_b$ and $R_c$, selecting robot base position combination schemes $\{Pos_1^b, Pos_2^b, \ldots, Pos_{nb}^b\}$ and $\{Pos_1^c, Pos_2^c, \ldots, Pos_{nc}^c\}$ covering all tasks $X^b$ and $X^c$ at the current cabin rotation positions $R_b$ and $R_c$, and obtaining stiffness values $\{K_1^b, K_2^b, \ldots, K_{nb}^b\}$ and $\{K_1^c, K_2^c, \ldots, K_{nc}^c\}$ corresponding to the robot base position combination schemes, wherein $Pos_{nb}^b$ represents an $n_b$-th robot base position combination scheme at the cabin rotation position $R_b$, and $K_{nc}^c$ represents a stiffness value of the robot executed machining tasks under the robot base position combination scheme $Pos_{nc}^c$;

according to the optimal scheme $Rot=\{R_a, R_b, \ldots, R_c\}$, wherein for any robot base position scheme $Pos_i=\{Pos_g^a, Pos_h^b, \ldots, Pos_l^c\}$, g, h, l≤j and g, h, l∈N*, $Pos_g^a$ represents a robot base position scheme $Pos_g^a$ adopted at the cabin rotation position $R_a$, $Pos_h^b$ represents a robot base position scheme $Pos_h^b$ adopted at the cabin rotation position $R_b$, and $Pos_l^c$ represents a robot base position scheme $Pos_l^c$ adopted at the cabin rotation position Re, calculating stiffness values $\{K_g^a, K_h^b, \ldots, K_l^c\}$ under the robot base position schemes $\{Pos_g^a, Pos_h^b, \ldots, Pos_l^c\}$, adopting a robot base position performance evaluation function $Pos\_fun=K_g^a+K_h^b+\ldots+K_l^c$, and selecting a scheme $Pos=\{Pos_g^a, Pos_h^b, \ldots, Pos_l^c\}$ with the optimal result of $Pos\_fun$ as a final robot base position scheme;

step 8: on the basis of the final robot base position scheme $Pos=\{Pos_g^a, Pos_h^b, \ldots, Pos_l^c\}$, obtaining a processable task set $X_{ri}=\{X_{ri}^{ag}, X_{ri}^{bh}, \ldots, X_{ri}^{cl}\}$ for a robot $r_i$, wherein i=1, 2, ..., m, $X_{ri}^{ag}$ represents a processable task set for the robot $r_i$ at the cabin rotation position $R_a$ in a case that the robot base position scheme $Pos_g^a$ is adopted, $X_{ri}^{bh}$ represents a processable task set for the robot $r_i$ at the cabin rotation position $R_b$ in a case that the robot base position scheme $Pos_h^b$ is adopted, and $X_{ri}^{cl}$ represents a processable task set for the robot $r_i$ at the cabin rotation position $R_c$ in a case that the robot base position scheme $Pos_l^c$ is adopted, and then assigning machining tasks to each robot; and step 9: assigning machining tasks to obtain a task assignment result $A_{ri}=\{A_{ri}^{ag}, A_{ri}^{bh}, \ldots, A_{ri}^{cl}\}$ for the robot $r_i$, wherein $A_{ri}^{ag}$ represents a machining task assignment result for the robot $r_i$ at the cabin rotation position $R_a$ under the robot base position scheme $Pos_g^a$, $A_{ri}^{bh}$ represents a machining task assignment result for the robot $r_i$ at the cabin rotation position $R_b$ under the robot base position scheme $Pos_h^a$, $A_{ri}^{cl}$ represents a machining task assignment result for the robot $r_i$ at the cabin rotation position R under the robot base position scheme $Pos_l^a$, optimizing a sequence of the robot executed machining tasks, forming a machining task timing scheduling table for each robot, and finally forming a machining scheduling scheme for a multi-robot team.

2. The method according to claim 1, wherein in step 1, the poses of the brackets to be machined change with the rotation of the cabin.

3. The method according to claim 2, wherein in step 2, the unit composition of the multi-robot operation system comprises a robot model, an AGV model, the number m of robots, end effector construction, and tool model and specification, wherein the size of the cabin of the spacecraft determines the robot model, the AGV model and the number m of robots, and the process requirement of the brackets to be machined on the surface of the cabin determines the end effector construction and the tool model and specification.

4. The method according to claim 3, wherein in step 3, the space layout scheme of the multi-robot system comprises the distribution of the robots on two sides of the cabin, and a relative position relationship between each robot and the cabin; the distribution of the robots on the two sides of the cabin influences relative position relationships among the robots, further influencing task assignment and task timing scheduling links; the relative position relationship between each robot and the cabin refers to a horizontal distance between each robot and an axis of the cabin and the height of the axis of the cabin from the ground, and the distance between each robot and the cabin influences the machining posture of each robot, further influencing the machining quality of each robot.

5. The method according to claim 4, wherein in step 4, the number k of the cabin rotation positions is calculated according to the following formula:

$$k=360/\alpha.$$

6. The method according to claim 5, wherein in step 5, the minimum number of rotation of the cabin $k_{min}$ refers to the minimum number of rotation of the cabin on a premise of covering all tasks in the total processable task set $X_R$.

7. The method according to claim 6, wherein in step 6, the number j of base positions selectable for the robots is calculated according to the following formula:

$$j=2l/s.$$

8. The method according to claim 7, wherein in step 8, assigning machining tasks to each robot refers to removing overlapping tasks and assigning unique tasks to a corresponding robot; the overlapping tasks refer to tasks processable for robots on the same side and processable at different cabin rotation angles, and the unique tasks refer to tasks only processable at one robot base position at one cabin rotation angle; the unique tasks are assigned to the corresponding robot, the current workload of the robot is calculated, and then the overlapping tasks are sequentially assigned to robots that are able to complete the overlapping tasks and have the least workload, completing a task assignment process for the multi-robot team.

9. The method according to claim 8, wherein in step 9, the machining task timing scheduling table for each robot refers to a sequence that each robot $r_i$ completes the tasks in the corresponding task set $A_{ri}=\{A_{ri}^{ag}, A_{ri}^{bh}, \ldots, A_{ri}^{cl}\}$; the machining scheduling scheme for the multi-robot team refers to a scheme in which cabin rotation angles and robot base positions during machining at different time nodes, and a list and sequence of robot executed machining tasks at different robot base positions are determined according to a time axis.

* * * * *